US012450167B1

(12) United States Patent
Menon et al.

(10) Patent No.: US 12,450,167 B1
(45) Date of Patent: Oct. 21, 2025

(54) AUTONOMOUS GRADIENT REDUCTION IN A RECONFIGURABLE PROCESSOR SYSTEM

(71) Applicant: SambaNova Systems, Inc., Palo Alto, CA (US)

(72) Inventors: Amitabh Menon, Palo Alto, CA (US); Greg Dykema, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/776,223

(22) Filed: Jul. 17, 2024

(51) Int. Cl.
*G06F 12/1081* (2016.01)
*G06F 9/54* (2006.01)

(52) U.S. Cl.
CPC .......... *G06F 12/1081* (2013.01); *G06F 9/544* (2013.01); *G06F 2212/65* (2013.01)

(58) Field of Classification Search
CPC ... G06F 12/1081; G06F 9/544; G06F 2212/65
See application file for complete search history.

(56) References Cited

U.S. PATENT DOCUMENTS

| | | | | |
|---|---|---|---|---|
| 11,416,411 B2* | 8/2022 | Ramadoss | | G06N 20/00 |
| 11,893,424 B2* | 2/2024 | Raumann | | G06N 3/098 |
| 2012/0079179 A1* | 3/2012 | Kwon | | G06F 15/76 |
| | | | | 711/E12.001 |
| 2021/0182077 A1* | 6/2021 | Chen | | G06F 40/263 |
| 2023/0259823 A1* | 8/2023 | Dykema | | G06N 3/098 |
| | | | | 706/12 |

* cited by examiner

Primary Examiner — Sean D Rossiter
(74) Attorney, Agent, or Firm — Flagship Patents; Sikander M. Khan; Gregory Nordstrom

(57) ABSTRACT

A coarse-grained reconfigurable processor (CGRP) system for implementing data-parallel training of a neural network is presented. The CGRP system includes a set of coarse-grained reconfigurable units (CGRUs) in a first CGRP configured to implement at least a portion of the neural network, to determine first and second gradients, respectively, of first and second model parameters based on a batch of training data, and to store the first and second gradients in a memory, a network interface including an external direct memory access (DMA) engine coupled between the memory and a network, and a work queue associated with the external DMA engine, wherein completion of determining the first gradient triggers a first work queue entry of the work queue that directs the external DMA engine to transfer the first gradient from the memory over the network to another memory coupled to a second CGRP for a gradient reduction operation.

20 Claims, 9 Drawing Sheets

AUTONOMOUS GRADIENT REDUCTION IN A RECONFIGURABLE PROCESSOR SYSTEM

RELATED APPLICATIONS AND DOCUMENTS

This application is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. patent application Ser. No. 18/218,562, published as US 2024/0020261, entitled "Peer-To-Peer Route Through In A Reconfigurable Computing System," filed on Jul. 5, 2023;

U.S. patent application Ser. No. 18/383,718, published as US 2024/0073129, entitled "Peer-To-Peer communication between Reconfigurable Dataflow Units," filed Oct. 25, 2023;

U.S. Provisional Patent Application No. 63/390,484, entitled "Peer-To-Peer Route Through In A Reconfigurable Computing System," filed on Jul. 19, 2022;

U.S. Provisional Patent Application No. 63/405,240, entitled "Peer-To-Peer Route Through In A Reconfigurable Computing System," filed on Sep. 9, 2022;

U.S. Provisional Application 63/389,767, entitled "Peer-to-Peer Communication between Reconfigurable Dataflow Units," filed on Jul. 15, 2022;

U.S. patent application Ser. No. 16/239,252, now U.S. Pat. No. 10,698,853, entitled "Virtualization of a Reconfigurable Data Processor," filed Jan. 3, 2019;

U.S. Provisional Patent Application No. 63/349,733, entitled "Head Of Line Blocking Mitigation In A Reconfigurable Data Processor," filed on Jun. 6, 2022;

U.S. patent application Ser. No. 18/107,613, published as US 2023/0251839, entitled "Head Of Line Blocking Mitigation In A Reconfigurable Data Processor," filed on Feb. 9, 2023;

U.S. patent application Ser. No. 18/107,690, published as US 2023/0251993, entitled "Two-Level Arbitration in a Reconfigurable Processor," filed on Feb. 9, 2023;

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744,077, now U.S. Pat. No. 11,836,629 B2, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688,069, now U.S. Pat. No. 11,327,717 B2, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718,094, now U.S. Pat. No. 11,150,872 B2, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/127,818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127,929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185,264, now U.S. Pat. No. 11,782,760 B2, filed Feb. 25, 2021, entitled "TIME-MULTIPLEXED USE OF RECONFIGURABLE HARDWARE;"

U.S. Nonprovisional patent application Ser. No. 17/216,647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216,650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/384,507, filed Jul. 23, 2021, entitled "LOSSLESS TILING IN CONVOLUTION NETWORKS-BACKWARD PASS;"

U.S. Nonprovisional patent application Ser. No. 17/379,921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379,924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Provisional Patent Application No. 63/236,218, filed Aug. 23, 2021, entitled "SWITCH FOR A RECONFIGURABLE DATAFLOW PROCESSOR;"

All of the related application(s) and documents listed above are hereby incorporated by reference herein for all purposes.

FIELD OF THE TECHNOLOGY DISCLOSED

The present technology relates to a coarse-grained reconfigurable processor system for implementing data-parallel training of a neural network. The present technology also relates to a method of operating a coarse-grained reconfigurable processor system for implementing data-parallel training of a neural network. Furthermore, the present technology relates to a plurality of reconfigurable processors for training a neural network.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, often include specialized hardware elements such as computing resources and device memory that operate in conjunction with one or more software elements such as a CPU and attached host memory in deep learning applications.

Deep learning is a subset of machine learning algorithms that are inspired by the structure and function of the human brain. Most deep learning algorithms involve artificial neural network architectures, in which multiple layers of neurons each receive input from neurons in a prior layer or layers, and in turn influence the neurons in the subsequent layer or layers.

Training a neural network involves determining weights that are associated with the neural network, and making inference involves using a trained neural network to compute results by processing input data based on weights associated with the trained neural network.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
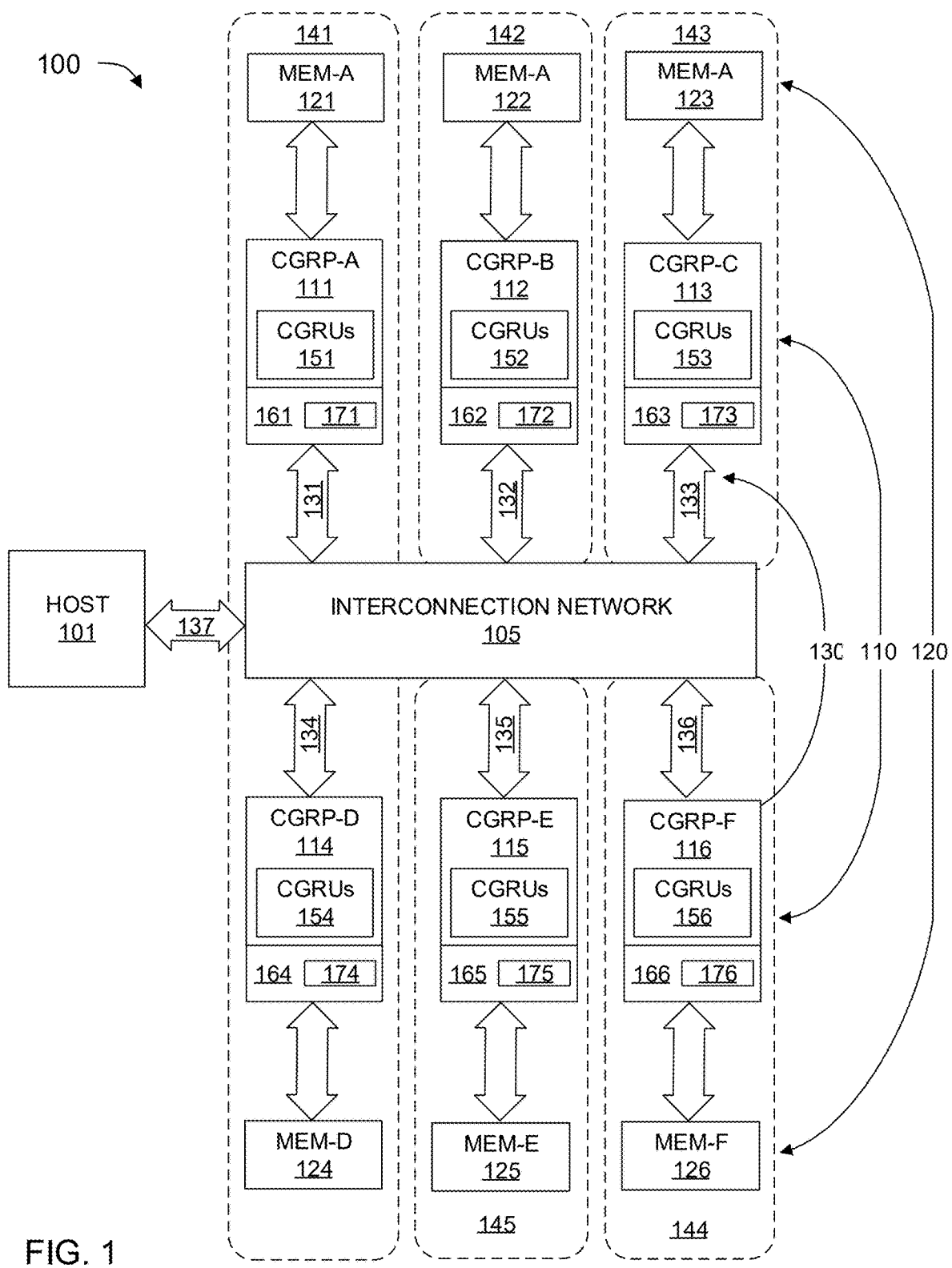
FIG. 1 is a diagram of an illustrative coarse-grained reconfigurable (CGR) processor (CGRP) system for implementing data parallel training of a neural network.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

Applications for machine learning (ML) and artificial intelligence (AI) may require massively parallel computations, where many parallel and interdependent threads (metapipelines) exchange data. Therefore, such applications are ill-suited for execution on Von Neumann computers. They require architectures that are adapted for parallel processing, such as coarse-grained reconfigurable (CGR) architectures (CGRAs) or graphic processing units (GPUs).

As mentioned above, CGRAs are an extremely attractive platform when performance, power, or energy efficiency are paramount. A CGRA is usually a composition of coarse-grained reconfigurable compute and memory elements that are interconnected together in a certain topology using a reconfigurable interconnect fabric. It is referred to as coarse-grained reconfigurable because the reconfigurable components in the architecture operate at a coarser granularity such as instructions, words, and vectors of words, as opposed to fine-grained, bit-level granularity commonly found in architectures such as FPGAs. The programmable data and control paths in CGRAs make them a natural fit to exploit nested parallelism in applications, by connecting the reconfigurable compute and memory components into customized, deeply nested, and hierarchical pipelines.

Reconfigurable processors such as (CGR) processors (CGRPs) are often complex and operate in conjunction with one or more software elements such as a host processor and attached host memory. The host processor typically provides a framework to orchestrate the management of configuration and execution of user applications on the reconfigurable processors.

Many kinds of algorithms can be implemented with CGRPs, such as certain aspects of natural-language processing, recommendation engines, database analytics, scientific applications, SQL data processing and deep learning.

Deep learning is a subset of machine learning algorithms that are inspired by the structure and function of the human brain. Most deep learning algorithms involve artificial neural network architectures, in which multiple layers of neurons each receive input from neurons in a prior layer or layers, and in turn influence the neurons in the subsequent layer or layers.

Examples of neural networks include Fully Connected Neural Networks (FCNNs), Recurrent Neural Networks (RNNs), Convolutional Neural Networks (CNNs), Long Short-Term Memory (LSTM) networks, autoencoders, deep belief networks, and Generative Adversarial Networks (GANs).

An example of training a neural network is determining one or more weights associated with the neural network. An example of making an inference is using a trained neural network to compute results by processing input data based on weights associated with the trained neural network. As used herein, the term 'weight' is an example of a 'parameter' as used in various forms of neural network processing. For example, some neural network learning is directed to determining parameters that are then usable for performing neural network inferences using the parameters.

A neural network processes data according to a dataflow graph comprising layers of neurons. Stimuli (e.g., input data) are received by an input layer of neurons and the computed results of the dataflow graph (e.g., output data) are provided by an output layer of neurons. Example layers of neurons include input layers, output layers, rectified linear unit layers, fully connected layers, recurrent layers, long short-term memory layers, convolutional layers, kernel layers, dropout layers, and pooling layers. A neural network is conditionally and/or selectively trained. After being trained, a neural network is conditionally and/or selectively used for inference.

Training a neural network can be computationally extremely demanding. Fortunately, the computations involved in network training often include lengthy sequences that are highly repetitive, and that do not depend on the internal results from other instances of the sequence. Such computations often can be parallelized by running different instances of the sequence on different machines.

Mechanisms for parallelizing neural network training can be divided roughly into two groups: model parallelism and data parallelism. In practice, parallelization mechanisms are sometimes mixed and matched, using a combination of model parallelism and data parallelism.

With model parallelism, the network model is divided up and parts of it are allocated to different machines. In some versions the model is divided longitudinally, such that upstream portions of the model are executed by one machine, which passes its results to another machine that executes downstream portions of the model. In the meantime, the upstream machine can begin processing the next batch of training data through the upstream portions of the model. In other versions of model parallelism, the model may include branches which are later merged downstream. In such versions the different branches could be processed on different machines.

With data parallelism, different instances of the same network model are programmed into different machines. The different instances typically each process different batches of the training data, and the partial results are combined. In particular, parallelizing deep learning applications, especially those based on Stochastic Gradient Decent (SGD), requires periodic sharing of intermediate results among the various nodes operating in parallel. For data parallelization, such intermediate results can include both partially aggregated gradients being shared with those of other worker nodes in order to enable calculation of the fully aggregated gradients, and fully aggregated gradients or updated neural network parameters being returned to the worker nodes.

However, the algorithms still require partial results to be shared periodically among the instances, so periodic sync-ups are still required as the algorithm proceeds. As more reconfigurable processors are involved in the computation process, many partial results need to be shared, leading to significant amounts of data being shared between the instances.

Typically, the host processor orchestrates the communication between the reconfigurable processors leading to significant communication overhead.

Therefore, it is desirable to provide a new coarse-grained reconfigurable processor system for implementing data-parallel training of a neural network that can initiate communication between the reconfigurable processors for the purpose of sharing partial results without using a source from outside the reconfigurable processors and with the goal of improving performance and communication bandwidth.

A coarse-grained reconfigurable processor (CGRP) system for implementing data-parallel training of a neural network is disclosed herein with reference to FIG. 1. As illustrated, the CGRP system 100 includes a host 101, a number of coarse-grained reconfigurable processors (CGRPs) 110 (111-116), an interconnection network 105 and communication links 130 (131-137) that connect the host 101 and the CGRPs 110 to the interconnection network 105. The coarse-grained reconfigurable processor system 100 includes a set of coarse-grained reconfigurable units (CGRUs) 151 in a first coarse-grained reconfigurable processor (CGRP) 111 as described with reference to FIGS. 2, 3A, and 3B. As shown in FIG. 1, CGRP-A 111, CGRP-B 112, CGRP-C 113, CGRP-D 114 CGRP-E 115, and CGRP-F 116 of CGRP system 100 include CGRUs 151, 152, 153, 154, 155, and 156, respectively.

The CGRP system 100 may include memory 120 respectively coupled to the CGRPs 110. The memory 120 can be any type of memory, including dynamic data rate (DDR) dynamic random-access memory (DRAM), including MEM-A 121 coupled to CGRP-A 111, MEM-B 122 coupled to CGRP-B 112, MEM-C 123 coupled to CGRP-C 113, MEM-D 124 coupled to CGRP-D 114, MEM-E 125 coupled to CGRP-E 115, and MEM-F 126 coupled to CGRP-F 116. Other implementations may include other types of memory in place of, or in addition to, the DDR DRAM, such as high-bandwidth memory (HBM), static memory, or flash memory.

CGRP-A 111 further includes a network interface 161 as described with reference to FIGS. 4 and 5 including an external direct memory access (DMA) engine 171 coupled between the memory MEM-A 121 and a network 105. As shown in FIG. 1, each CGRP has its own network interface with external DMA engine. Thus, CGRP-A 111, CGRP-B 112, CGRP-C 113, CGRP-D 114 CGRP-E 115, and CGRP-F 116 include network interface 161, 162, 163, 164, 165, and 166, respectively, which include external DMA engines 171, 172, 173, 174, 175, and 176, respectively.

Moreover, CGRP-A 111 includes a work queue as described with reference to FIG. 6 associated with the external DMA engine 171. The set of CGRUs 151 is configured to implement at least a portion of the neural network, to determine first and second gradients, respectively, of first and second model parameters based on a batch of training data, and to store the first and second gradients in memory MEM-A 121. Completion of determining the first gradient triggers a first work queue entry of the work queue that directs the external DMA engine 171 to transfer the first gradient from memory MEM-A 121 over the network 105 to another memory (e.g., memory MEM-B 122 that is coupled to CGRP-B 112) for a gradient reduction operation.

The coarse-grained reconfigurable processor system 100 may extend dataflow graphs to memory-to-memory direct memory access (DMA) functionality using message-based triggers. Communication between the first and second CGRPs may be achieved using external DMA transactions over Ethernet, which are sometimes also referred to as Ethernet DMA (EDMA). Illustratively, the external DMA transactions over Ethernet may be implemented as a layer on the top of the Ethernet frame of Ethernet and transferred over the Layer 2 Ethernet network by encapsulating the EDMA transactions in the Ethernet frame payload. If desired, the external DMA transactions over Ethernet may be implemented using user datagram protocol (UDP) packets. Units on the internal intra-die networks in the CGRP may include specific functionality to support external DMA transactions over Ethernet. A detailed description of the communication between the first and second CGRPs is provided in the description of FIGS. 4 and 5.

For example, the host 101 may be, or include, a computer including an input device, one or more processors, a storage device, and an output device. The input device may comprise a mouse, a keyboard, a sensor, an input port (e.g., a universal serial bus (USB) port), and/or any other input device known in the art. The output device may comprise a monitor, printer, and/or any other output device known in the art. Illustratively, part or all of input device and output device may be combined in a network interface, such as a Peripheral Component Interconnect Express (PCIe) interface or high-speed Ethernet interface suitable for communicating with the CGRPs 110 via communication link 137.

Host 101 runs runtime processes, as further referenced herein, and may also be used to run computer programs, such as a compiler. In some implementations, the compiler may run on a computer that is similar to the computer described above, but separate from host 101.

The communication links 130 can be any type of communication link, parallel or serial, electrical or optical. In some implementations, the interconnection network 105 may include an Ethernet network, and the communication links 130 may be Ethernet links. In these implementations, the network interface of the CGRP system (e.g., network interfaces 161 to 166 of the CGRPs 111 to 116) may include an Ethernet network interface. The Ethernet links may be compliant with any version of the Ethernet specification. The interconnection network 105 may have any type of topology depending on the system design and particular implementation.

In some implementations, the interconnection network 105 may be implemented as direct links between pairs of devices where each device is one of CGRP 111-116 or host 101. For example, the host may have six individual links that respectively directly connect to the six CGRPs 111-116 and each CGRP may, in addition to its link connecting to the host 101, have a link to each of the other CGRPs 111-116. In that implementation, CGRP-A 111 has a first link connecting directly to the host 101, a second link connecting directly to CGRP-B 112, a third link connecting directly to CGRP-C 113, a fourth link connecting directly to CGRP-D 114, a fifth link connecting directly to CGRP-E 115, and a sixth link connecting directly to CGRP-F 116. Thus, link 131 may include six individual links. In other implementations, the interconnection network 105 may include a bus structure or a switching fabric that is able to route a transaction from an originating CGRP 110 or host 101 to a destination CGRP 110 or host 101.

As discussed above, each of the CGRPs 110 may include a set of CGRUs 151-156 that may comprise a grid of compute units and memory units interconnected with an internal network including an internal switching array fabric such as those detailed elsewhere in this specification. The CGRPs 110 can be configured by downloading configuration files from the host 101 to configure the CGRPs 110 to execute one or more graphs (e.g., graphs 141-145) that define dataflow computations, and can implement any type of functionality including, data-parallel training of a neural network.

The communication links 130 and the interconnection network 105 provide a high degree of connectivity that can increase the dataflow bandwidth between the CGRPs 110 and enable the CGRPs 110 to cooperatively process large volumes of data via the dataflow operations specified in the execution graphs 141-145.

A set of graphs 141-145 can be assigned to the CGRP system 100 for execution. The graphs 141-145 are overlaid on the block diagram of the CGRP system 100 showing how they may be assigned to the CGRPs 110. In the example shown, graph1 141 is assigned to CGRP-A 111 and CGRP-D 114, graph2 142 is assigned to CGRP-B 112, graph3 143 is assigned to CGRP-C 113, graph4 144 is assigned to CGRP-F 116, and graph 5 145 is assigned to CGRP-E 115. While the set of graphs 141-145 is statically depicted, one of skill in the art will appreciate that the execution graphs are likely not synchronous (i.e., of the same duration) and that the partitioning within a CGR computing environment will likely be dynamic as execution graphs are completed and replaced.

As can be understood from FIG. 1, nodes of a graph may be distributed across multiple CGRPs. Nodes of a graph within a CGRP may communicate using internal communication paths of the CGRP, but communication between nodes of a single graph in different CGRPs may use EDMA or peer-to-peer (P2P) communication over the links 130 and interconnection network 105.

As an example, for implementing data-parallel training of a neural network, consider the scenario in which a set of CGRUs 153 of CGRP-C 113 is configured to implement at least a portion of the neural network as specified in graph 3 143 and that another set of CGRUs 156 of CGRP-F 116 is configured to implement the same portion of the neural network as specified in graph 4 144.

In this scenario, a set of CGRUs 153 in CGRP-C 113 determines a first gradient of a first model parameter based on a first batch of training data, stores the first gradient in local memory MEM-C 123 of CGRP-C 113, and sends the first gradient to CGRP-F 116 for a gradient reduction operation. For the purposes of this disclosure, in a typical system, a connected processor of host 101 may be used to move the gradient from MEM-C 123 coupled to CGRP-C 113 to MEM-F 126 coupled to CGRP-F 116. In contrast to a typical system, in the CGRP system 100 for implementing data-parallel training as disclosed herein, the completion of determining the first gradient with the set of CGRUs 153 in CGRP-C 113 and storage into MEM-C 123 triggers a work queue entry of a work queue as described in FIG. 6, which directs external DMA engine 173 to transfer the first gradient from the MEM-C 123 coupled to CGRP-C 113 directly over the network 105 to MEM-F 126 coupled to CGRP-F 116 for a gradient reduction operation without passing through the host 101. Illustratively, the work queue entry is triggered without action from a source outside of CGRP-C 113 and MEM-C 123 while the set of CGRUs 153 in CGRP-C 113 determines a second gradient of a second model parameter based on the first batch of training data.

Illustratively, the external DMA engine 173 may guarantee lossless delivery of the first gradient from the MEM-C 123 to MEM-F 126. In some implementations, for this purpose, the network interface 163 may include at least one input buffer to receive a portion of the first gradient from MEM-C 123, a shared replay buffer, and a transmit circuit. Depending on the implementation, the portion of the first gradient may be the entire first gradient or a subset of the first gradient. The transmit circuit may be designed to send a plurality of packets, including the portion of the first gradient from the at least one input buffer, to MEM-F 126 over the network 105. The portion of the first gradient may be stored in the shared replay buffer from at least a time the portion of the first gradient is sent over the network 105 as a first transmission until an acknowledgement message is received through the network indicating that the portion of the first gradient has been received. In the event that the portion of the first gradient has not been received, a negative acknowledgement message received through the network may initiate re-sending the portion of the first gradient stored in the shared replay buffer. The shared replay buffer may be included in an E-Shim such as E-Shim 257 or 258 of FIG. 2.

If desired, the first gradient may be transmitted using any other mechanism of lossless delivery. As an example, selective replay may be performed. Selective replay still requires a replay buffer but does not require packets received after a lost packet to be replayed. However, selective replay requires destinations to reorder received packets. As another example, network switch fabrics that guarantee delivery by internally replaying packets or parts of packets (cells) that are routed on separate paths for better load balancing may be used.

The additional set of CGRUs 156 in CGRP-F 116 may be configured to determine a third gradient of the first model parameter and a fourth gradient of the second model parameter based on another batch of the training data. CGRP-F 116 may include an additional network interface 166 with an additional external (DMA) engine 176 coupled between the additional set of CGRUs 156 and the network 105. CGRP-F 116 may include an additional work queue as described in FIG. 6, which is associated with the additional external DMA engine 176, and completion of determining the fourth gradient and storage into MEM-F 126 may trigger a first work queue entry of the additional work queue that direct the additional external DMA engine 176 to transfer the fourth gradient from MEM-F 126 coupled to CGRP-F 116 over the network 105 to MEM-C 123 coupled to CGRP-C 113 for an additional gradient reduction operation.

Illustratively, the external DMA engine 173 may transfer one or more conditions to the additional set of CGRUs 156 or to the additional external DMA engine 176 in CGRP-F 116. For example, the external DMA engine 173 may tell the additional set of CGRUs 156 that the DMA transfer has completed or tell the additional external DMA engine 176 to start the transfer of the fourth gradient.

In some implementations, the additional set of CGRUs 156 may be configured to respond to a notification that the first gradient has copied from MEM-C 123 to MEM-F 126 over the network 105 and to implement a first portion of the gradient reduction operation by generating an updated first model parameter based on the first model parameter, the first gradient, and the third gradient. The CGRUs 156 may then start another DMA operation by external DMA engine 176 to copy the fourth gradient from MEM-F 126 to MEM-C 123 over the network 105. If desired, the set of CGRUs 153 may be notified that the the fourth gradient has been copied to MEM-C 123 and to implement a second portion of the gradient reduction operation by generating an updated second model parameter based on the second model parameter, the second gradient, and the fourth gradient.

Completion of determining the updated first model parameter in CGRP-F 116 may trigger a second work queue entry of the additional work queue associated with additional external DMA engine 176 that directs the additional external DMA engine 176 to transfer the updated first model parameter over the network 105 to MEM-C 123. Similarly, completion of determining the second updated model parameter in CGRP-C 113 may trigger a second work queue entry of the work queue associated with external DMA engine 173 that directs the external DMA engine 173 to transfer the updated second model parameter over the network 105 to MEM-F 126.

As another example, for data-parallel training a neural network, consider CGRP-C 113, CGRP-E 115, and CGRP-F 116 that are interconnected by interconnection network 105. CGRP-C 113 with coarse-grained reconfigurable units (CGRUs) 153 is configured to implement a portion of the neural network as specified in graph 3 143. CGRP-C 113 is further configured to determine first, second, and third gradients of first, second, and third model parameters, respectively, based on a first batch of training data and to store the first, second, and third gradients in local memory MEM-C 123 that is coupled to CGRUs 153. Completion of determining the respective first, second, and third gradient triggers a respective first, second, and third work queue entry. Furthermore, CGRP-F 116 is configured to implement the same portion of the neural network as CGRP-C 113 as specified in graph 4 144. CGRP-F 116 with CGRUs 156 is further configured to determine fourth, fifth, and sixth gradients of the first, second, and third model parameters, respectively, based on a second batch of training data that is different than the first batch and to store the fourth, fifth, and sixth gradients in local memory MEM-F 126 that is coupled to CGRUs 156. Completion of determining the respective fourth, fifth, and sixth gradient triggers a respective fourth, fifth, and sixth work queue entry. Moreover, CGRP-E 115 with CGRUs 155 is configured to implement the same portion of the neural network as CGRP-C 113 and CGRP-F 116 as specified in graph 5 145. CGRP-E 115 is further configured to determine seventh, eighth, and ninth gradients of the first, second, and third model parameters, respectively, based on a third batch of training data that is different than the first and second batches and to store the seventh, eighth, and ninth gradients in local memory MEM-E 125 that is coupled to CGRUs 155. Completion of determining the respective seventh, eighth, and ninth gradient triggers a respective seventh, eighth, and ninth work queue entry.

As shown in FIG. 1, CGRP-C 113, CGRP-E 115, and CGRP-F 116 have respective network interfaces 163, 165, 166 with respective first, second, and third external DMA engines 173, 175, 176, coupled between the respective local memories and the interconnection network 105. For executing an external DMA write operation, each one of the first, second, and third network interfaces 163, 165, 166 includes a transmit circuit that is designed to send a plurality of packets including a respective gradient of the first to ninth gradients to a predetermined destination over the interconnection network 105 for a gradient reduction operation as directed by a respective work queue entry of the first to ninth work queue entries. If desired, the first work queue entry is triggered without any action from a source outside of CGRP-C 113 while CGRP-C 113 determines the second and third gradients.

Illustratively, the gradient reduction operation is one of a ring-based reduction operation, an all-to-all based reduction operation, a binary tree-based reduction operation, or a hierarchical combination thereof. For example, the gradient reduction operation is a ring-based reduction operation that uses a ring formed by CGRP-C 113, CGRP-E 115, and CGRP-F 116. The ring-based reduction operation may include a reduce-scatter operation as further illustrated in FIG. 7 and an all-gather operation as further illustrated in FIG. 8.

In the examples above, each instance of the neural network is implemented in a single CGRP. However, only portions of a CGRP may implement an instance of the neural network, whereas as shown in FIG. 1 CGRP-A 111 and CGRP-D 114 (i.e., more than one CGRP) may be required to implement an instance of the neural network.

As mentioned above, the host 101 may configure the CGRPs 110 by downloading configuration bit files to the CGRPs 110. This may be accomplished by sending the configuration bit files over the communication links 130 (i.e., 131, 132, 133, 134, 135, 136) and interconnection network 105. The configuration bit files can include information to configure individual CGRUs within the CGRPs 110 (which are described in more detail below) as well as the internal communication paths between those units.

The configuration bit files may be static for the duration of execution of a graph and configure a portion of one of CGRPs 111-116 (or the entire CGRP) to execute one or more nodes of an execution graph 141-145. Although the detailed description is focused on extending dataflow graphs to memory-to-memory direct memory access (DMA) functionality using message-based triggers, other functionality is envisioned to be covered by the described subject matter. Discussion of extending dataflow graphs to memory-to-memory direct memory access (DMA) functionality using message-based triggers is not intended to limit the detailed description to extending dataflow graphs to memory-to-memory direct memory access (DMA) functionality using message-based triggers or to limit the detailed description in any way.

Figure 2:
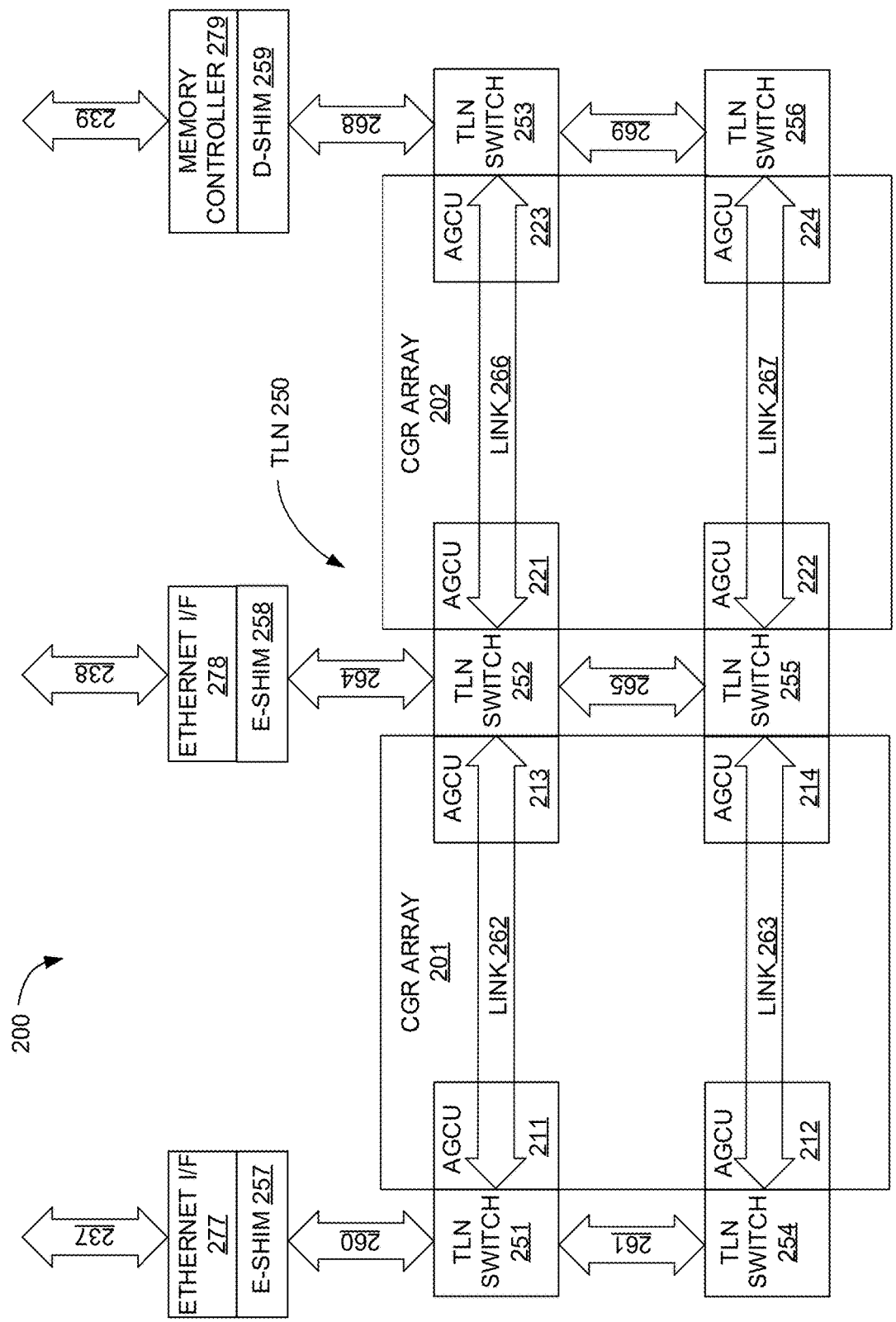
FIG. 2 is a simplified block diagram of an illustrative CGR processor (CGRP) having a CGR architecture (CGRA).

FIG. 2 is a simplified block diagram of an example of a CGRP 200 having a CGRA, according to an implementation of the present disclosure, which may be used as CGRP 111-116 in the CGRP system 100 of FIG. 1. In this example, the CGRP 200 has 2 CGR arrays (CGR array 201, CGR array 202), although other implementations can have any number of CGR arrays, including a single CGR array. Each CGR array 201, 202 (which is shown in more detail in FIG. 3A) comprises an array of reconfigurable units connected by an array-level network (ALN) in this example. Each of the two CGR arrays 201 and 202 has one or more address generation and coalescing units (AGCUs) 211, 212, 213, 214, 221, 222, 223, 224. The AGCUs 211, 212, 213, 214, 221, 222, 223, 224 are nodes on both a top-level network (TLN) 250 and on ALNs within their respective CGR arrays 201, 202 and include resources for routing data among nodes on the TLN 250 and nodes on the ALN in each CGR array 201, 202.

The CGR arrays 201-202 are coupled to TLN 250 that includes TLN switches 251, 252, 253, 254, 255, 256 and links 260-269 that allow for communication between elements of CGR array 201, elements of CGR array 202, and shims to other functions of the CGRP 200 including Ethernet shims (E-Shims) 257, 258 and a double data rate (DDR) memory shim (D-Shim) 259. Other functions of the CGRP 200 may connect to the TLN 250 in different implementations, such as additional shims to additional and or different input/output (I/O) interfaces and memory controllers, and other chip logic such as control/status registers (CSRs), configuration controllers, or other functions.

Data travel in packets between the devices (including TLN switches 251-256) on the links 260-269 of the TLN 250. For example, TLN switches 251 and 252 are connected by a link 262, TLN switches 251 and E-Shim 257 are connected by a link 260, TLN switches 251 and 254 are connected by a link 261, and TLN switch 253 and D-Shim 259 are connected by a link 268.

The TLN 250 may be a packet-switched mesh network with four independent networks operating in parallel; a request network, a data network, a response network, and a credit network. While FIG. 2 shows a specific set of switches and links, various implementations may have different numbers and arrangements of switches and links. All four networks (request, data, response, and credit) may follow the same protocol. In some implementations, the four networks may differ in the size and format of their payload packets.

A TLN transaction may include four parts, a valid signal, a header, a packet, and a credit signal. To initiate a transaction, a TLN agent (the driver) can assert the valid signal and drive the header on the link connected to a receiver. The header may include the node ID of the source and destination. Note that source and destination refer to the endpoints of the overall transaction, not the ID of an intermediate agent such as a switch.

In the following cycle, the agent may drive the packet. The credit signal is driven by the receiver back to the driver when it has dequeued the transaction from its internal queues. TLN agents may have input queues to buffer incoming transactions. Hop credits may be assigned to drivers based on the sizes of those queues. A driver cannot initiate a transaction (i.e. assert the valid signal) unless it has credits available.

Two types of credits may be used to manage traffic on TLN 250. The first type of credit, as mentioned above, includes hop credits. These are credits used to manage the flow of transactions between adjacent points on the network. The other type of credits is referred to as end-to-end credits. In order to prevent persistent backpressure on the TLN 250, communication on the TLN 250 is controlled by end-to-end credits. The end-to-end credits create a contract between a transaction source and an endpoint to which it sends the transaction. An exception to this is a destination that processes inbound traffic immediately with no dependencies. In that case, the number of end-to-end credits can be considered infinite, and no explicit credits are required. The number of end-to-end credits may be selected based on the size of input queues in the destination units.

Agents may perform both a hop credit check to the connected switch and an end-to-end credit check to the final destination. The transaction can only take place if a credit is available to both. Note that the TLN components (e.g. TLN switches) do not directly participate in or have any knowledge of end-to-end credits. These are agreements between the connected agents and not a function of the network itself.

As was previously mentioned, the TLN 250 is a packet-switched mesh network using an array of TLN switches for communication between agents. Any routing strategy can be used on the TLN 250, depending on the implementation, but some implementations may arrange the various components of the TLN 250 in a grid and use a row, column addressing scheme for the various components. Such implementations may then route a packet first vertically to the designated row, and then horizontally to the designated destination. Other implementations may use other network topologies and/or routing strategies for the TLN 250.

E-Shims 257, 258 provide an interface between the TLN 250 and Ethernet Interfaces 277, 278 which connect to external communication links 237, 238 which may form part of communication links 130 as shown in FIG. 1. While two E-Shims 257, 258 with Ethernet interfaces 277, 278 and associated Ethernet links 237, 238 are shown in FIG. 2, implementations can have any number of E-Shims and associated Ethernet interfaces and links.

A D-Shim 259 provides an interface to a memory controller 279, which has a DDR interface 239 and can connect to memory such as the memory 120 of FIG. 1. While only one D-Shim 259 is shown, implementations can have any number of D-Shims and associated memory controllers and memory interfaces. Different implementations may include memory controllers for other types of memory, such as a flash memory controller and/or a high-bandwidth memory (HBM) controller. The interfaces 257-259 include resources for routing data among nodes on the top-level network (TLN) 250 and external devices, such as high-capacity memory, host processors, other CGRPs, FPGAs and so on, that are connected to the interfaces 257-259.

As explained earlier, in the system shown in FIG. 1 each CGRP can include a set of CGRUs. The set of CGRUs may be arranged in an array of CGRUs, which is sometimes also referred to as CGR array and that is disposed in a configurable interconnect (ALN). The configuration file defines a dataflow graph including functions in the CGRUs and links between the functions in the configurable interconnect. In this manner, the CGRUs function as sources or sinks of data used by other CGRUs providing functional nodes of the graph. Such systems can use external data processing resources not implemented using the configurable array and interconnect, including memory and a processor executing a runtime program, as sources or sinks of data used in the graph.

Furthermore, such systems may include communication resources which can be arranged in a mesh-like network known as a TLN 250. The communication resources may facilitate communication between the configurable interconnect of the ALN and the external data processing resources (memory and host). In some implementations, the CGR arrays, CGR array 201 and CGR array 202, in the CGRP 200 may be connected to the host 101 of FIG. 1 via the top-level network (TLN) 250 including links 260-269 shown in FIG. 2.

More details about the TLN and the on-chip arrangement of the CGRP 200, the ALN, and the TLN and communication among those are described in a related U.S. provisional patent application 63/349,733), which is incorporated by reference herein in its entirety.

Figure 3A:
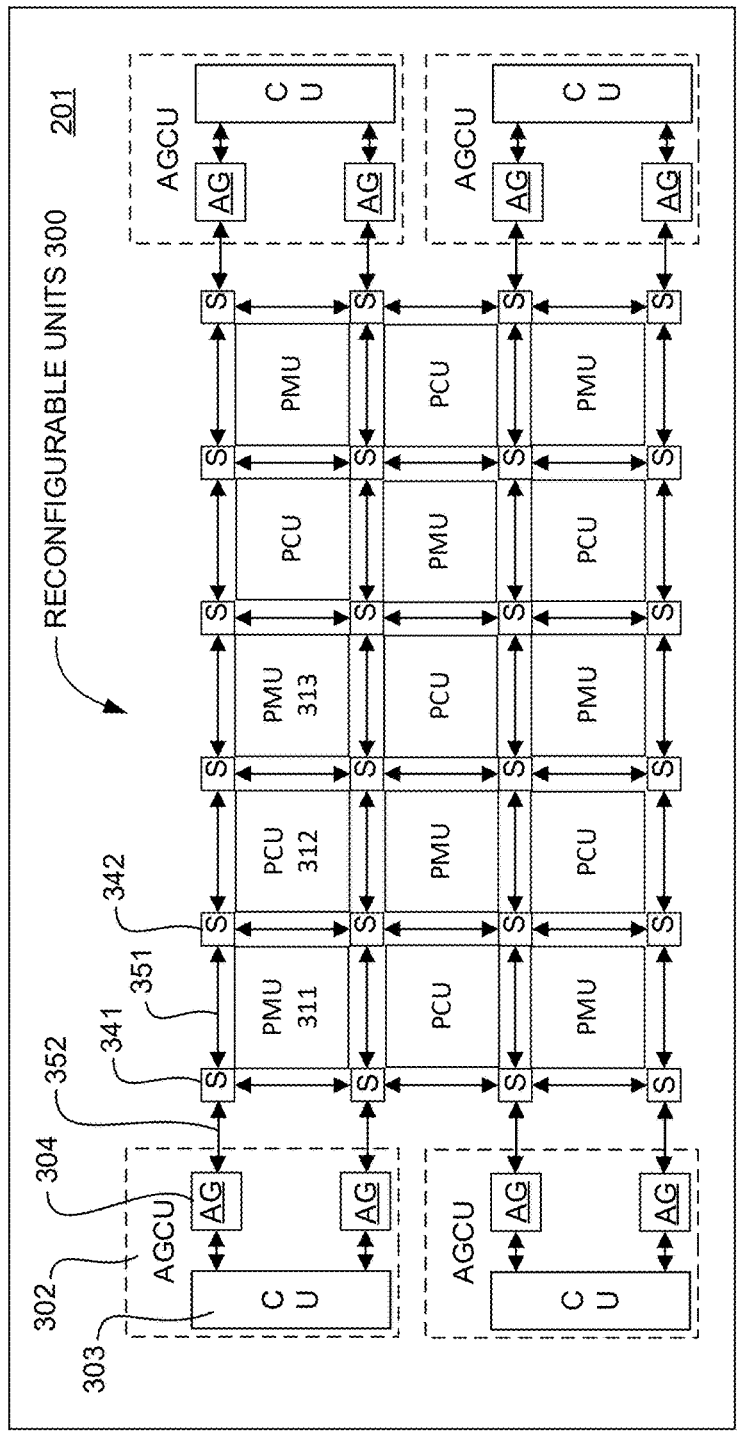
FIG. 3A is a simplified block diagram illustrating an example CGR array of a CGRP.

FIG. 3A is a simplified diagram of CGR array 201 (which may be identical to CGR array 202) of FIG. 2, where the CGRUs, which are sometimes also simply referred to as reconfigurable units, in the array of reconfigurable units 300 are nodes on the array-level network (ALN). In this example, the array of reconfigurable units 300 includes a plurality of types of reconfigurable units. The types of reconfigurable units or CGRUs in this example include Pattern Compute Units (PCU) such as PCU 312, Pattern Memory Units (PMU) such as PMUs 311, 313, switch units(S) such as Switches 341, 342, and Address Generation and Coalescing Units (AGCU) such as AGCU 302.

An AGCU can include one or more address generators (AG) such as AG 304 and a shared coalescing unit (CU) such as CU 303. For an example of the functions of these types of reconfigurable units, see, Prabhakar et al., "Plasticine: A Reconfigurable Architecture For Parallel Patterns", ISCA '17, Jun. 24-28, 2017, Toronto, ON, Canada, which is incorporated by reference herein in its entirety.

Each of these reconfigurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Additionally, each of these reconfigurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of reconfigurable units by a configuration load/unload controller in an AGCU based on the contents of the bit file to allow all the components to execute a program (i.e., a graph). Program Load may also load data into a PMU memory.

The array-level network includes links interconnecting reconfigurable units in the array. The links in the array-level network include one or more and, in this case three, kinds of physical buses: a chunk-level vector bus (e.g. 128 bits of data), a word-level scalar bus (e.g. 32 bits of data), and a multiple bit-level control bus. For instance, interconnect 351 between switch 341 and 342 or interconnect 352 between AG 304 and switch 341 includes a vector bus interconnect with vector bus width of 128 bits, a scalar bus interconnect with a scalar bus width of 32 bits, and a control bus interconnect.

The three kinds of physical buses differ in the granularity of data being transferred. In some implementations, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The header is transmitted on a header bus to each reconfigurable unit in the array of reconfigurable units.

In one example, a chunk of data of 128 bits is transmitted on the vector bus that provides the chunk as vector inputs to a reconfigurable unit. The vector bus can include 128 payload lines, and a set of header lines. The header can include a sequence ID for each chunk, which can include (as non-limiting examples):

A bit to indicate if the chunk is scratchpad memory or configuration store data. Bits that form a chunk number.

Bits that indicate a column identifier.
Bits that indicate a row identifier.
Bits that indicate a component identifier.

The array-level network may route the data of the vector bus and/or scalar bus using two-dimension order routing using either a horizontal first or vertical first routing strategy. The vector bus and/or scalar bus may allow for other types of routing strategies, including using routing tables in switches to provide a more flexible routing strategy in some implementations.

Figure 3B:
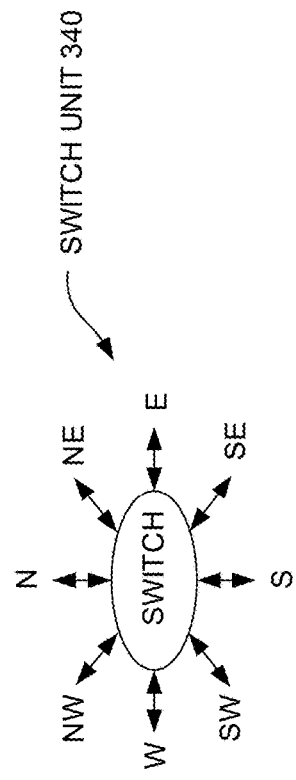
FIG. 3B illustrates an example switch unit for connecting elements in an array-level network.

FIG. 3B illustrates an example switch unit 340 connecting elements in an array-level network such as switches 341, 342 connecting reconfigurable units 300 in FIG. 3A. As shown in the example of FIG. 3B, a switch unit can have eight interfaces. The North, South, East, and West interfaces of a switch unit are used for connections between switch units. The Northeast, Southeast, Northwest, and Southwest interfaces of a switch unit are each used to make connections to PCU or PMU instances. At least some switch units at the edges of the CGR array have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the eight interfaces of a switch unit can include a vector interface, a scalar interface, and a control interface to communicate with the vector network, the scalar network, and the control network.

During execution of a machine after configuration, data can be sent via one or more-unit switches and one or more links between the unit switches to the reconfigurable units using the vector bus and vector interface(s) of the one or more switch units on the array-level network.

The reconfigurable units can access off-chip memory through D-Shim 259 and memory controller 279 (see FIG. 2) by routing a request through an AGCU. An AGCU contains a reconfigurable scalar datapath to generate requests for the off-chip memory. The AGCU contains FIFOs (first-in-first-out buffers for organizing data) to buffer outgoing commands, data, and incoming responses from the off-chip memory.

The address generators (AGs) in the AGCUs can generate memory commands that are either dense or sparse. Dense requests can be used to bulk transfer contiguous off-chip memory regions and can be used to read or write chunks of data from/to reconfigurable units in the array of reconfigurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

As shown in FIG. 1, there are cases where a source CGRP may want to perform read or write direct memory access (DMA) operations to transfer data between a source memory coupled to the source CGRP and a destination memory coupled to a destination CGRP. An E-Shim lossless protocol provides a way to accomplish this communication. The E-Shim lossless protocol provides lossless network connectivity for dataflow applications over Ethernet in the event of drops over a layer 2 (L2) network. The E-Shim implements lossless connectivity on a per-stream basis, where a stream is a connection between a source CGRP E-Shim and a destination CGRP E-Shim. Each stream may carry Ethernet DMA (EDMA) transactions, which are encapsulated in Ethernet frames. EDMA traffic includes user space DMA operations to move data between a source CGRP memory and either a destination CGRP memory or a host memory.

As an example, a set of CGRUs on one CGRP may want to send a gradient for a gradient reduction operation to another CGRP. A peer-to-peer (P2P) protocol provides several primitives that can be used to accomplish this, including a remote write, a remote read request, a remote read completion, a stream write, a stream clear-to-send (SCTS), and/or an RSync Barrier, which is a special primitive that is not encapsulated in a P2P header.

The P2P primitives can be used to create more complex transactions that utilize one or more P2P primitive operations. The P2P complex transactions may include a remote store, a remote scatter write, a remote read, a remote gather read, a stream write to a remote PMU, a stream write to remote DRAM, a host write, a host read, and/or a barrier operation. Similar to EDMA transactions, each stream may also carry P2P transactions, which are encapsulated in Ethernet frames. Ethernet P2P traffic includes P2P primitive operations and P2P complex transactions to move data between a reconfigurable unit on a source CGRP and either a destination CGRU on a destination CGRP or a destination CGRP memory coupled to the destination CGRP.

Figure 4:
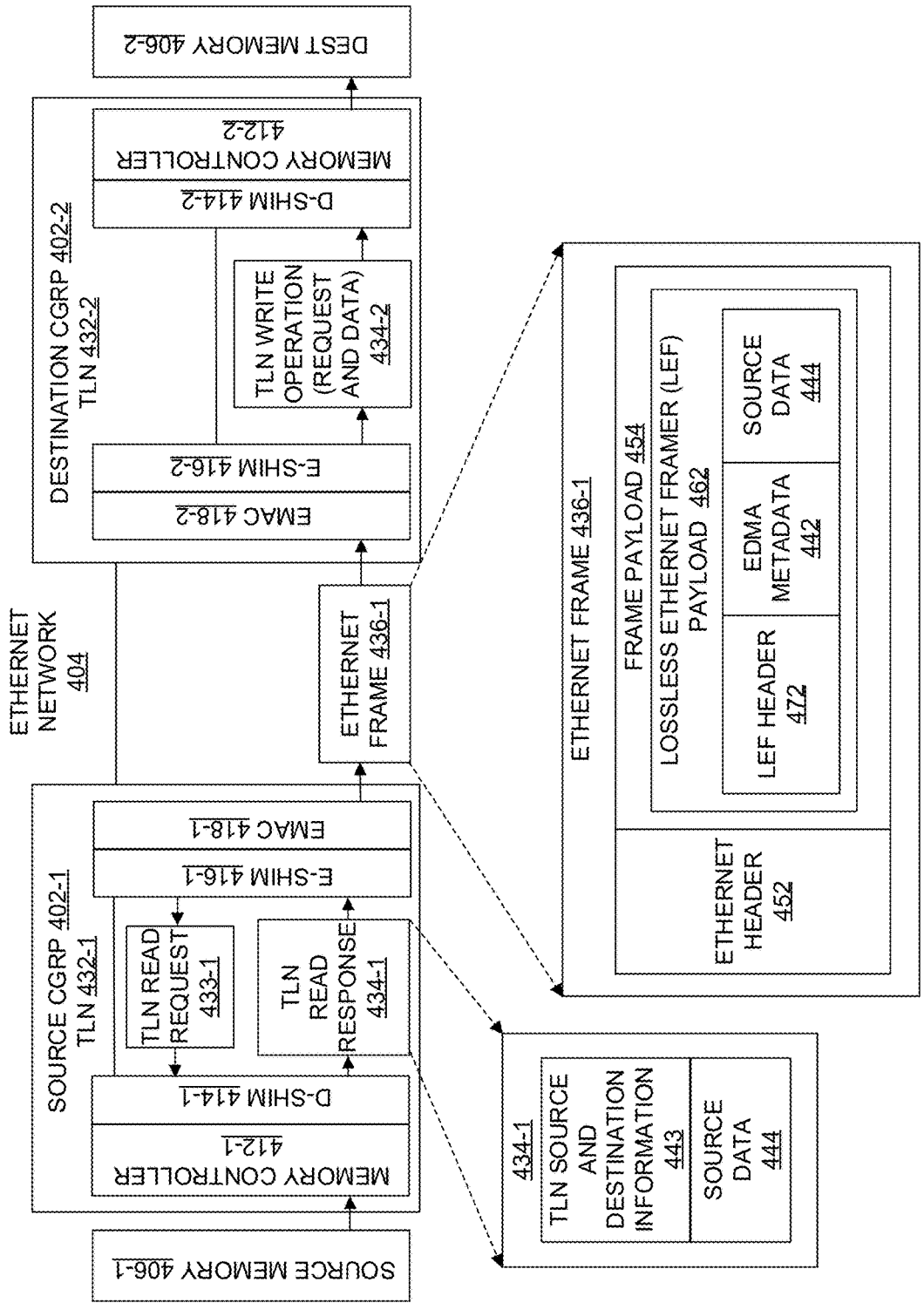
FIG. 4 is a diagram of an illustrative Ethernet direct memory access (EDMA) write operation using an E-Shim lossless protocol.

FIG. 4 illustrates an example of an Ethernet direct memory access (EDMA) write operation using the E-Shim lossless protocol, according to an implementation of the present disclosure. An EDMA write operation allows a source CGRP 402-1 to perform a DMA data transfer from a source memory 406-1 of the source CGRP 402-1 to a destination memory 406-2 of a destination CGRP 402-2 over an Ethernet network 404.

The source and destination memories 406-1 and 406-2 can each be a memory, such as MEM-A 121 and MEM-B 122, respectively, previously described with reference to FIG. 1. The illustrated CGRP 402-1 includes a memory controller 412-1, a D-Shim 414-1, a TLN 432-1, an E-Shim 416-1, and an EMAC 418-1. Similarly, the illustrated CGRP 402-2 includes a memory controller 412-2, a D-Shim 414-2, a TLN 432-2, an E-Shim 416-2, and an EMAC 418-2. The illustrated CGRPs 402-1 and 402-2, memory controllers 412-1 and 412-2, D-Shims 414-1 and 414-2, E-Shims 416-1 and 416-2, EMACs 418-1 and 418-2, and the TLNs 432-1 and 432-2, may be structurally and functionally similar to the corresponding CGRP 200, memory controller 279, D-Shim 259, E-Shims 257 and 258, Ethernet interfaces 277 and 278, and TLN 250 previously described with reference to FIG. 2.

During an EDMA write operation, the source E-Shim 416-1 sends a TLN read request 433-1 to a D-Shim 414-1 over the TLN 432-1 to retrieve source data at a source address of the source memory 406-1. The illustrated TLN read request 433-1 may comprise metadata including a D-Shim identifier (ID) associated with the D-Shim 414-1, a source address of the source data in the source memory 406-1, an E-Shim ID associated with the source E-Shim 416-1 as a TLN destination, a number of bytes to be accessed, and a operation type indicating that it is a read request.

The TLN 432-1 uses the D-Shim ID of the read request 433-1 to identify a specific agent on the TLN 432-1 and provides the read request 433-1 to the D-Shim 414-1 associated with the D-Shim ID. The D-Shim 414-1 receives the read request 433-1 and provides the source data address and the number of bytes to be accessed to the memory controller 412-1 to initiate the read operation. The memory controller 412-1 performs the read operation and provides the source data from the source memory 406-1 to the D-Shim 414-1 which sends, over the TLN 432-1 based on the metadata received with the read request, a read response 434-1 back to the E-Shim 416-1 comprising TLN source and destination information 443 and the source data 444 transferred from the source memory 406-1.

The E-Shim 416-1 receives the read response 434-1, generates a lossless Ethernet Framer (LEF) payload 462 that includes a LEF header 472 that provides information used by a lossless protocol engine to recover from lost packets and/or errors, EDMA metadata 442 which includes TLN source and destination information 443 to provide information such as transaction type (e.g. read or write), destination address, and payload size, and the source data 444. An Ethernet frame 436-1 including an Ethernet header 452 and a frame payload 454, which may simply be the LEF payload 462, is then generated by the E-Shim 416-1 and passed to the EMAC 418-1 to be sent over the Ethernet network 404 to the destination CGRP 402-2.

Information for the Ethernet header 452 may be retrieved from a stream table. A stream, as the term is used herein, includes one or more flows having a common source CGRP and destination CGRP. A flow, as the term is used herein, is a set of transactions from one particular source in the source CGRP to another particular destination on the destination CGRP. The source CGRP 402-1 may use information from the destination address to access a stream table which is populated with information about the source and destination CGRPs associated with each stream. Information stored in the stream table may include source and destination MAC addresses, IP addresses, as well as an identifier for the destination CGRP. Various implementations may include other information or leave out some of the recited information.

The EMAC 418-2 of the destination CGRP 402-2 receives the Ethernet frame 436-1 and provides the Ethernet frame 436-1 to the E-Shim 416-2. The E-Shim 416-2 de-frames the Ethernet frame 436-1 and generates a write request of TLN write operation 434-2 based on the EDMA metadata 442 and the source data 444 of the Ethernet frame 436-1. The E-Shim 416-2 sends the write request and data of the TLN write operation 434-2 to the D-Shim 414-2 over the TLN 432-2 to perform a DMA write operation of the source data 444 at the destination address in the destination memory 406-2. Similar to the TLN 432-1 previously described, the TLN 432-2 uses the D-Shim ID of the write request of the TLN write operation 434-2 to identify a specific agent on the TLN 432-2 and provides the write request and data of the TLN write operation 434-2 to the D-Shim 414-2 associated with the D-Shim ID.

The D-Shim 414-2 receives the request and data of the TLN write operation 434-2 and provides DMA write operation information including the destination data address, and the number of bytes to be written, and the source data 444 to the memory controller 412-1 to initiate the write operation. The memory controller 412-1 performs the write operation to store the source data 444 at the destination address in the destination memory 406-2. Once the memory controller 412-2 completes the EDMA write operation, the D-Shim 414-2 sends, over the TLN 432-2, a message indicating that the EDMA write operation of the source data from the source memory 406-1 has been transferred into the destination memory 406-2 at the destination address.

In some implementations, the EDMA operation may be a scatter/gather DMA operation and instead of providing one memory address and the number of bytes to be accessed, a pair of a memory address and a corresponding number of bytes to be accessed at the memory address is provided for each piece of data in the scatter/gather DMA operation.

If desired, the E-Shim 416-1 may implement a lossless protocol that may provide lossless network connectivity for dataflow applications over the Ethernet network 404 when the E-Shim 416-1 detects Ethernet frame drops over a Layer 2 Ethernet network. As illustrated, the frame payload 454 may also include a lossless Ethernet Framer (LEF) payload comprising a LEF header 472, the EDMA metadata 442, and the source data 444.

The LEF header 472 may comprise a LEF frame ID, a destination CGRP, a source CGRP, a lossless Ethernet (LE) protected indicator, an acknowledgement (ACK) request indicator, a replayed frame indicator, a transfer (TX) port, a packet type, a packet sequence number (PSN), a stream number, a stream sequence number (SSN), and an application ID.

The LEF frame ID may identify the frame as conforming to the LEF protocol.

The LE protected indicator may indicate that the specific Ethernet frame is within a stream that is protected by a lossless Ethernet protocol.

The ACK request indicator may indicate that the current Ethernet frame requires an ACK back from a destination CGRP. When a source CGRP sets the ACK request indicator in the LEF header to indicate that an ACK is requested, it directs the destination CGRP to reply with an ACK. Regardless of receiving the ACK request indicator, the destination CGRP may be configured to send periodic ACK frames to the source CGRP.

The replayed frame indicator may indicate that the current Ethernet frame is a re-transmission Ethernet frame in response to a dropped Ethernet frame. When the source CGRP sets the replayed frame indicator in the LEF header to indicate that the current Ethernet frame is a re-transmission Ethernet frame, it may indicate to the destination CGRP that the Ethernet frame is a re-transmission Ethernet frame triggered by a previous negative acknowledgement (NACK) event.

The TX port may identify which Ethernet port is to be used to transmit the Ethernet frame.

The packet type may identify the type of packet, such as, a start stream packet, a P2P packet, an EDMA packet, an ACK packet, or a negative acknowledgement (NACK) packet.

The PSN may be sequentially incremented for each Ethernet frame of a protected stream. The PSN may have a value of zero for each Ethernet frame of a non-protected stream. The source CGRP may set the PSN of every Ethernet frame that is to be transmitted.

The stream number may identify which of the active streams on the source CGRP may have sent this Ethernet frame.

The SSN may be associated with a stream and may remain constant throughout the lifetime of the associated stream. An SSN for each stream may be initialized to a value of zero and may be sequentially incremented when the associated stream ends and is deallocated. The SSN may be used to differentiate packets belonging to different PSN sequences which may be using the same stream related hardware. The PSN may not be used for each Ethernet frame of a non-protected stream.

The application ID may identify the application associated with the Ethernet frame. The application identified by the application ID may be a dataflow graph including a neural network or portions of a neural network that may be configured onto at least the source CGRP and the destination CGRP and is to be executed on these CGRPs.

Figure 5:
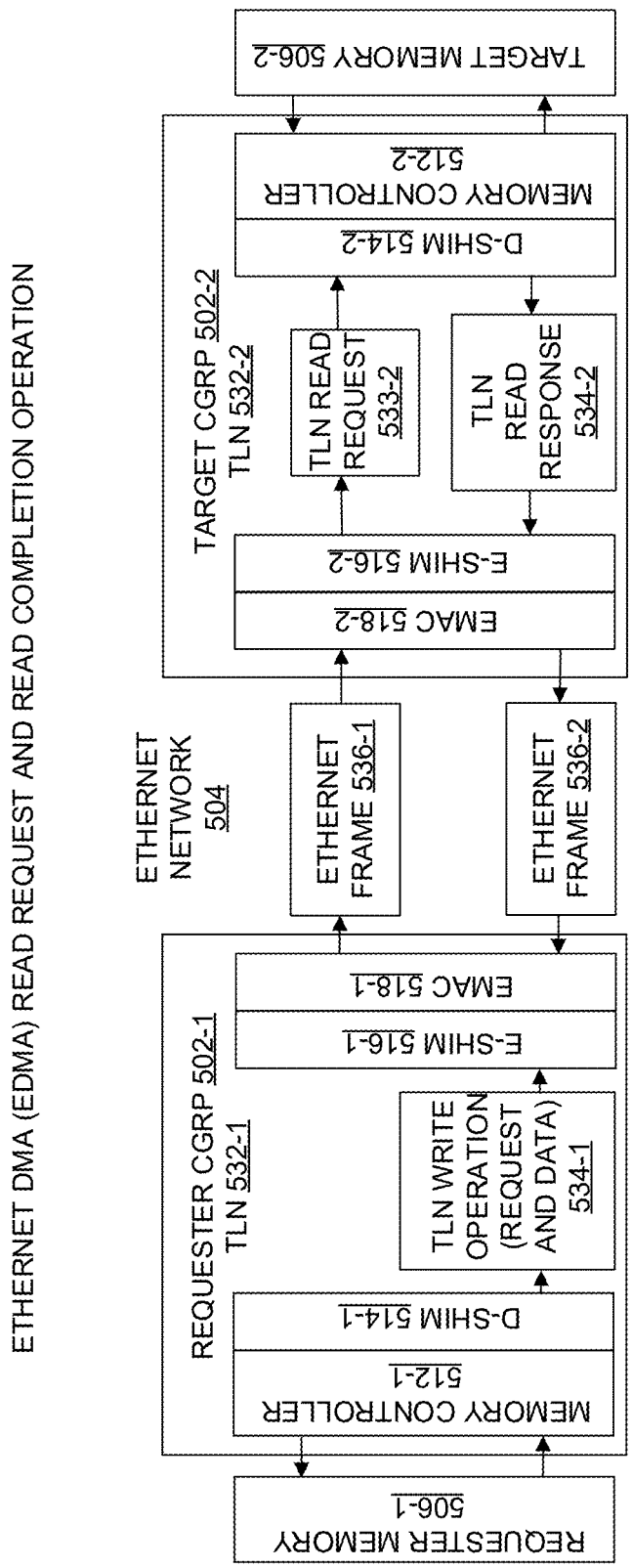
FIG. 5 is a diagram of an illustrative Ethernet direct memory access (EDMA) read operation using the E-Shim lossless protocol.

FIG. 5 illustrates an example of an EDMA read operation, according to an implementation of the present disclosure. An EDMA read operation allows an E-Shim 516-1 in a requester CGRP 502-1 to request a target CGRP 502-2 to provide data from a target memory 506-2 of the target CGRP 502-2 over an Ethernet network 504 to the requester CGRP 502-1. The E-Shim 516-1 then sends the data over its local TLN to D-Shim 514-1 to be written into requester memory 506-1. The EDMA completion operation functions similarly to the EDMA write request operation previously described with reference to FIG. 4.

During an EDMA read operation, the requester E-Shim 516-1 of the requester CGRP 502-1 generates a requester Ethernet frame 536-1 to perform a remote EDMA read operation to retrieve target data at a target address of the target memory 506-2 coupled to a target CGRP 502-2. The requester Ethernet frame 536-1 may comprise EDMA read request metadata including a target address of the target data in the target memory 506-2 coupled to the target memory controller 512-2, a number of bytes to be accessed, a DMA operation type indicating that the DMA operation is a DMA read request, and a requester E-Shim ID associated with the requester E-Shim 516-1. The E-Shim 516-1 transmits, using the requester EMAC 518-1, the requester Ethernet frame 536-1 over the Ethernet network 504 to the target CGRP 502-2.

The EMAC 518-2 of the target CGRP 502-2 receives the Ethernet frame 536-1 and provides the Ethernet frame 536-1 to the E-Shim 516-2. The E-Shim 516-2 de-frames the Ethernet frame 536-1 and generates a TLN read request 533-2 based on the EDMA read request metadata of the Ethernet frame 536-1. The E-Shim 516-2 sends the TLN read request 533-2 to the D-Shim 514-2 over the TLN 532-2 to retrieve target data at the target address of the target memory 506-2. The TLN 532-2 uses the D-Shim ID of the EDMA read request 533-2 to identify the D-Shim 514-2 and provides the TLN read request 533-2 to the D-Shim 514-2. The D-Shim 514-1 receives the EDMA read request 533-2 and provides the DMA read operation information including the target data address and the number of bytes to be accessed to the memory controller 512-2 to initiate the read operation.

The memory controller 512-2 performs the read operation to transfer the target data from the target memory 506-2 to the D-Shim 514-2. Once the memory controller 512-2 completes the EDMA read operation, the D-Shim 514-2 sends, over the TLN 532-2, a TLN read completion packet 534-2 including the target data transferred from the target memory 506-2 to the target E-Shim 516-2.

The E-Shim 516-2 receives the read completion packet 534-2, generates an Ethernet frame 536-2 including an Ethernet header (based on the EDMA meta data received in the TLN read request 533-2) and a frame payload, and encapsulates the target data into the frame payload of the Ethernet frame 536-2.

The E-Shim 516-2 transmits, using the EMAC 518-2, the Ethernet frame 536-2 over the Ethernet network 504 to the requester CGRP 502-1.

The EMAC 518-1 of the requester CGRP 502-1 receives the Ethernet frame 536-2 and provides the Ethernet frame 536-2 to the E-Shim 516-1. The E-Shim 516-1 de-frames the Ethernet frame 536-2 and generates a TLN write operation 534-1 (including a write request and write data) based on the EDMA metadata and the target data of the Ethernet frame 536-2. The E-Shim 516-1 sends the TLN write operation 534-1 to the D-Shim 514-1 over the TLN 532-1 which then uses the memory controller 512-1 to perform the write operation to store the target data at the requester address in the requester memory 506-1. Once the memory controller 512-1 completes the EDMA write operation, the D-Shim 514-1 sends, over the TLN 532-1, a message indicating that the EDMA write operation of the target data from the target memory 506-2 has been transferred into the requester memory 506-1 at the requester address.

Figure 6:
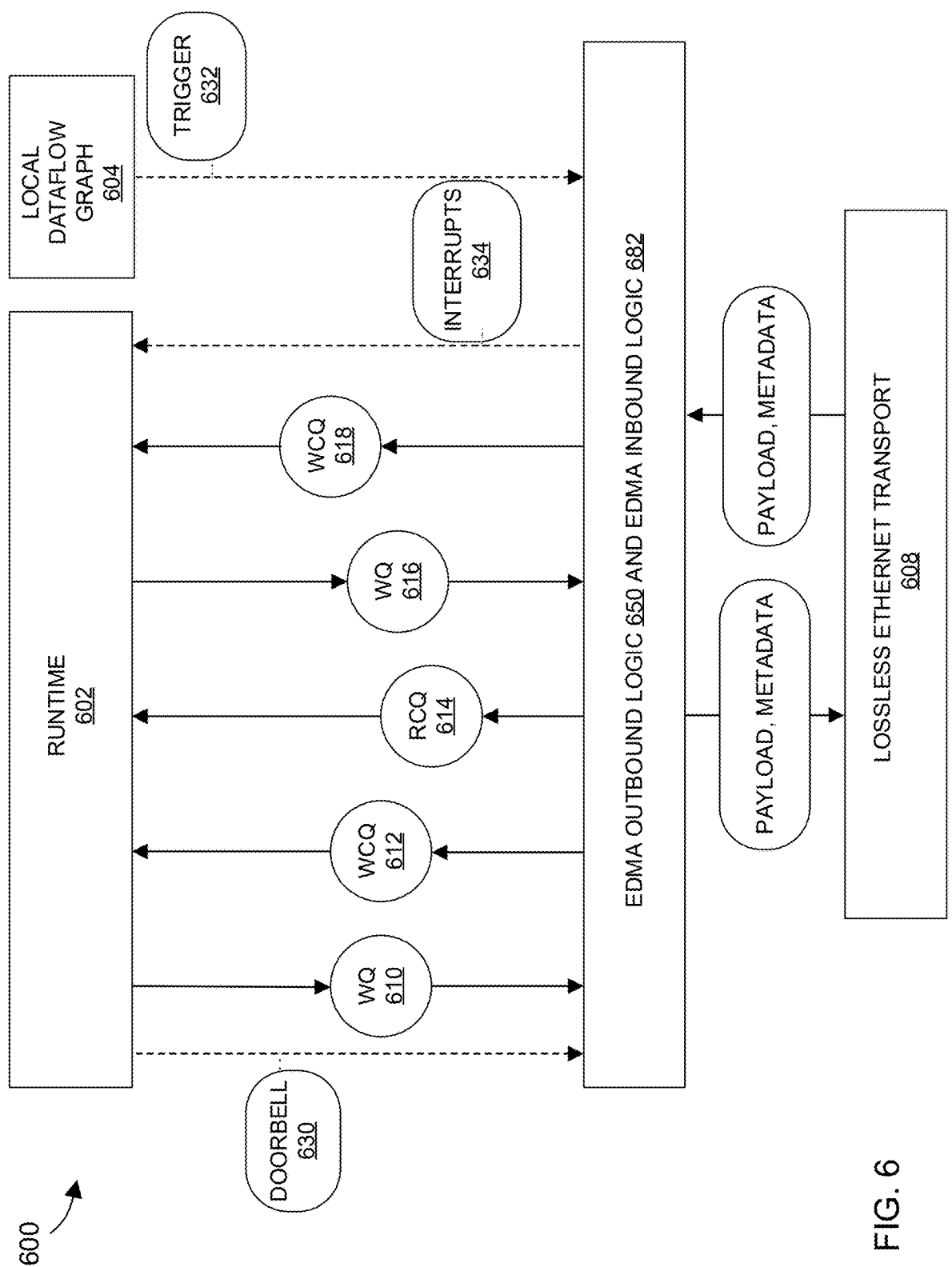
FIG. 6 is a block diagram illustrating example Ethernet direct memory access (EDMA) data transfers, in operation with descriptors in work queues, between one or more CGRPs and host memory.

FIG. 6 is a block diagram illustrating an example CGRP system 600 for Ethernet direct memory access (EDMA) data transfers, such as the transfer of gradients for a gradient reduction operation, in operation with descriptors in work queues, between one or more CGRPs and host memory, according to an implementation of the present disclosure. The illustrated CGRP system 600 includes a runtime 602, a local dataflow graph 604 (e.g., training of a neural network), EDMA outbound logic 650, EDMA inbound logic 682, and Lossless Ethernet Transport (LET) 608. The illustrated runtime 602 may include runtime processes, software, and computer programs, which a host (e.g., host 101 of FIG. 1), may be used to run. E-Shim may implement a lossless Ethernet (LE) transport 608, the EDMA outbound logic 650, and the EDMA inbound logic 682.

The LET 608 may use a lossless Ethernet transport protocol to transfer data over the Ethernet network between a CGRP and another CGRP or between a CGRP and a host memory. The LET 608 may use a new application programming interface (NAPI) like model for an extension to an Ethernet device driver frame processing framework for transferring data over the Ethernet network, which may improve the performance of high-speed networking.

EDMA outbound logic 650 and EDMA inbound logic 682 may each perform user space DMA transfers using transfer descriptors in the work queues (WQs). The WQs may each be stored in local memory in a CGRP, in a memory in the host 101, or in an external memory that is accessible by the host 101. The WQs may operate concurrently and may share the Ethernet bandwidth.

The runtime 602 software may configure work queues, such as WQ 610 and 616, with work queue entries (WQEs). Each WQ may be associated with a particular EDMA engine, and each WQE may be associated with a particular stream. Each WQE may encapsulate information that EDMA outbound logic 650 and EDMA inbound logic 682 may use to perform a single transfer between two CGRPs, such as CGRPs 502-1 and CGRP 502-2 previously described with reference to FIG. 5. The information in a WQE may point to contiguous read and write data buffers in a CGRP, in a memory in the host 101, or in an external memory that is accessible by the host 101. In some cases, the data to be transferred may be embedded in a WQE that may be used for control and other short messages.

Each WQ has an associated location pointer and head and tail offsets that each EDMA outbound logic 650 and EDMA inbound logic 682 may use to process a particular WQE such as the head WQE in the WQ, or perform other actions. EDMA outbound logic 650 and EDMA inbound logic 682 may maintain each WQ including the head and tail offsets for the current WQEs. Any WQ can be designated as an Ethernet Network Interface Controller (E-NIC) WQ, where each WQE of the E-NIC WQ may point to a single L3/L4 packet created by a software driver. EDMA outbound logic 650 and EDMA inbound logic 682 may bypass the lossless protocol to transmit these packets.

The information in each WQE may also include a local target, for example, an E-Shim, which may be sent a completion notification or a trigger, as programmed and configured by runtime 602. The information may further include a WQ pause processing indicator and an ignore ACK requirements indicator.

The EDMA outbound logic 650 and EDMA inbound logic 682 may each read a current WQE from a WQ and may convert the WQE into a series of transfer queue entries (TQEs), each may correspond to a single packet for transfer.

For example, the network interface may include a transfer descriptor memory, and the current WQE may direct the EDMA outbound logic 650 to generate an EDMA transfer queue entry in the transfer descriptor memory. If desired, the WQE may generate a transfer frame including a transfer frame header and a transfer frame payload. The transfer frame header may be generated based on a protocol of the Ethernet network. The transfer frame payload may include an EDMA header and the data to be transferred. In some implementations, the WQE may direct the EDMA outbound logic 650 to halt transfer of the data to be transferred until one or more conditions are met.

Each WQ may be triggered to start operation. EDMA outbound logic 650 and EDMA inbound logic 682 may each process WQEs in a WQ until the WQ runs to completion, EDMA outbound logic 650 and EDMA inbound logic 682 may each encounter a WQE that indicates the WQ is to be paused, or the WQ is suspended. In either case, the WQ is suspended. A WQ may be woken up from a suspended state and may continue to process WQEs by a doorbell write, such as a doorbell write 630 from runtime 602, a trigger write 632 from a local dataflow graph 604 that may be running on a CGRP, or a message, such as a message trigger, over a TLN from a CGR array of a CGRP that may be executing the local dataflow graph 604. In some embodiments, the message from the TLN may be an I/O device message. In a similar manner, transfers may also be triggered by doorbell write 630 and trigger write 632, and message triggers from a CGR array of a CGRP. Completion notifications to runtime 602 may be sent through completion queues and completion notifications may be sent to a CGR array of CGRP with messages, for example, I/O device messages.

Messages, for example I/O device messages, may be used to communicate messages between E-Shims, such as E-Shim, which includes the EDMA outbound logic 650, the EDMA inbound logic 682, and LET 608, and AGCUs, such as AGCU 302, on the request network of a TLN of a CGRP. The EDMA outbound logic 650 and EDMA inbound logic 682 may each use messages to receive triggers from an AGCU or another E-Shim to wake up a suspended WQ, which may be equivalent to a doorbell write to wake up a suspended WQ. The EDMA outbound logic 650 and EDMA inbound logic 682 may each also use a message to notify another E-Shim that an EDMA transfer has completed. These notifications may be initiated by an E-Shim or received by this E-Shim when the notification is a remote notification from another E-Shim. An address in the request may be used to encode properties of the message, such as an I/O device message. The message may include an address, which may contain a physical WQ ID. Messages used to communicate completion notifications may trigger WQs when they are sent to a recipient E-Shim, where the recipient E-Shim may include itself.

The runtime 602 software may configure work completion queues (WCQs), such as WCQ 612 and WCQ 618, with work completion queue entries (WCQEs). A WCQE may be used to communicate the completion of a DMA transfer specified by a WQE and performance measurement information for the DMA transfer. Each WCQE may include a completion status and a WQE identifier (ID) that identifies the WQE associated with the completion status, which may be provided to runtime 602. Runtime 602 may use the completion status to determine whether the DMA transfer completed successfully or had an error.

The runtime 602 software may configure response completion queues (RCQs), such as RCQ 614, with response completion queue entries (RCQEs). A RCQE may be used to communicate the completion of a request on the request network of a TLN of a CGRP.

The EDMA outbound logic 650 and EDMA inbound logic 682 may each send an interrupt, such as an interrupt 634, to runtime 602 that may indicate dropped ACK packets, dropped frames, and a lost link connection, a number of request NACK packets sent by a receiver exceeds a threshold, and other similar events.

Figure 7:
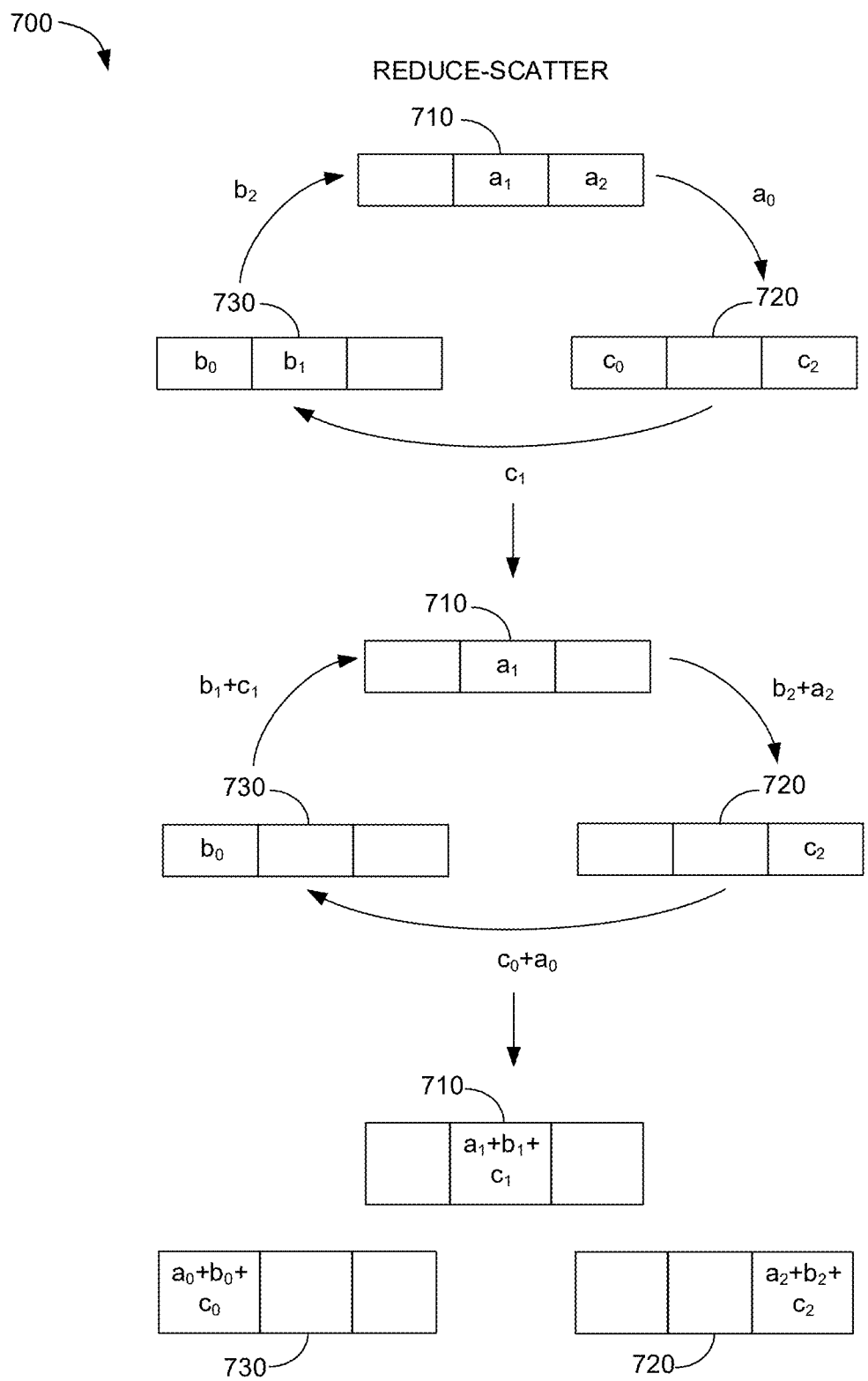
FIG. 7 is a diagram of an illustrative reduce-scatter operation of a coarse-grained reconfigurable processor system performs as part of a ring-based gradient reduction.

FIG. 7 is a diagram of an illustrative reduce-scatter operation 700 of a coarse-grained reconfigurable processor system (e.g., a CGRP system including CGRPs 113, 115, and 116 of FIG. 1) performs as part of a ring-based gradient reduction operation.

Illustratively, first reconfigurable processor 710 is configured to determine first, second, and third gradients a0, a1, and a2 of first, second, and third model parameters, respectively, and to store the first, second, and third gradients in a first local memory coupled to the first reconfigurable processor 710, whereby completion of determining the respective first, second, and third gradients triggers a respective first, second, and third work queue entry. Second reconfigurable processor 720 is configured to determine fourth, fifth, and sixth gradients c0, c1, and c2 of first, second, and third model parameters, respectively, and to store the fourth, fifth, and sixth gradients in a second local memory coupled to the second reconfigurable processor 720, whereby completion of determining the respective fourth, fifth, and sixth gradients triggers a respective fourth, fifth, and sixth work queue entry. Third reconfigurable processor 730 is configured to determine seventh, eighth, and ninth gradients b0, b1, and b2 of first, second, and third model parameters, respectively, and to store the seventh, eighth, and ninth gradients in a third local memory coupled to the third reconfigurable processor 730, whereby completion of determining the respective seventh, eighth, and ninth gradients triggers a respective seventh, eighth, and ninth work queue entry.

During the Reduce-Scatter Operation:

A first external DMA write operation defined by the first work queue entry is triggered upon completion of the first gradient a0 by the first reconfigurable processor 710. The first external DMA write operation transmits the first gradient a0 for generating a first reduced gradient (a0+c0) in the gradient reduction operation with the fourth gradient c0 from the first local memory over the external network to the second local memory.

A second external DMA write operation defined by the fourth work queue entry is triggered upon completion of the fifth gradient a1 by the second reconfigurable processor 720. The second external DMA write operation transmits the fifth gradient c1 for generating a second reduced gradient (c1+b1) in the gradient reduction operation with the eighth gradient b1 from the second local memory over the external network to the third local memory.

A third external DMA write operation defined by the seventh work queue entry is triggered upon completion of the ninth gradient b2 by the third reconfigurable processor 730. The third external DMA write operation transmits the ninth gradient b2 for generating a third reduced gradient (b2+a2) in the gradient reduction operation with the third gradient a2 from the third local memory over the external network to the first local memory.

A fourth external DMA write operation defined by the fifth work queue entry is triggered upon completion of the first reduced gradient (a0+c0) by the second reconfigurable processor 720. The fourth external DMA write operation transmits the first reduced gradient (a0+c0) for generating a first updated model parameter (a0+b0+c0) in the gradient reduction operation with the seventh gradient b0 from the second local memory over the external network to the third local memory.

A fifth external DMA write operation defined by the eighth work queue entry is triggered upon completion of the second reduced gradient (b1+c1) by the third reconfigurable processor 730. The fifth external DMA write operation transmits the second reduced gradient (b1+c1) for generating a second updated model parameter (a1+b1+c1) in the gradient reduction operation with the second gradient a1 from the third local memory over the external network to the first local memory.

A sixth external DMA write operation defined by the second work queue entry is triggered upon completion of the third reduced gradient (a2+b2) by the first reconfigurable processor 710. The sixth external DMA write operation transmits the third reduced gradient (a2+b2) for generating a third updated model parameter (a2+b2+c2) in the gradient reduction operation with the sixth gradient c2 from the first local memory over the external network to the second local memory.

Figure 8:
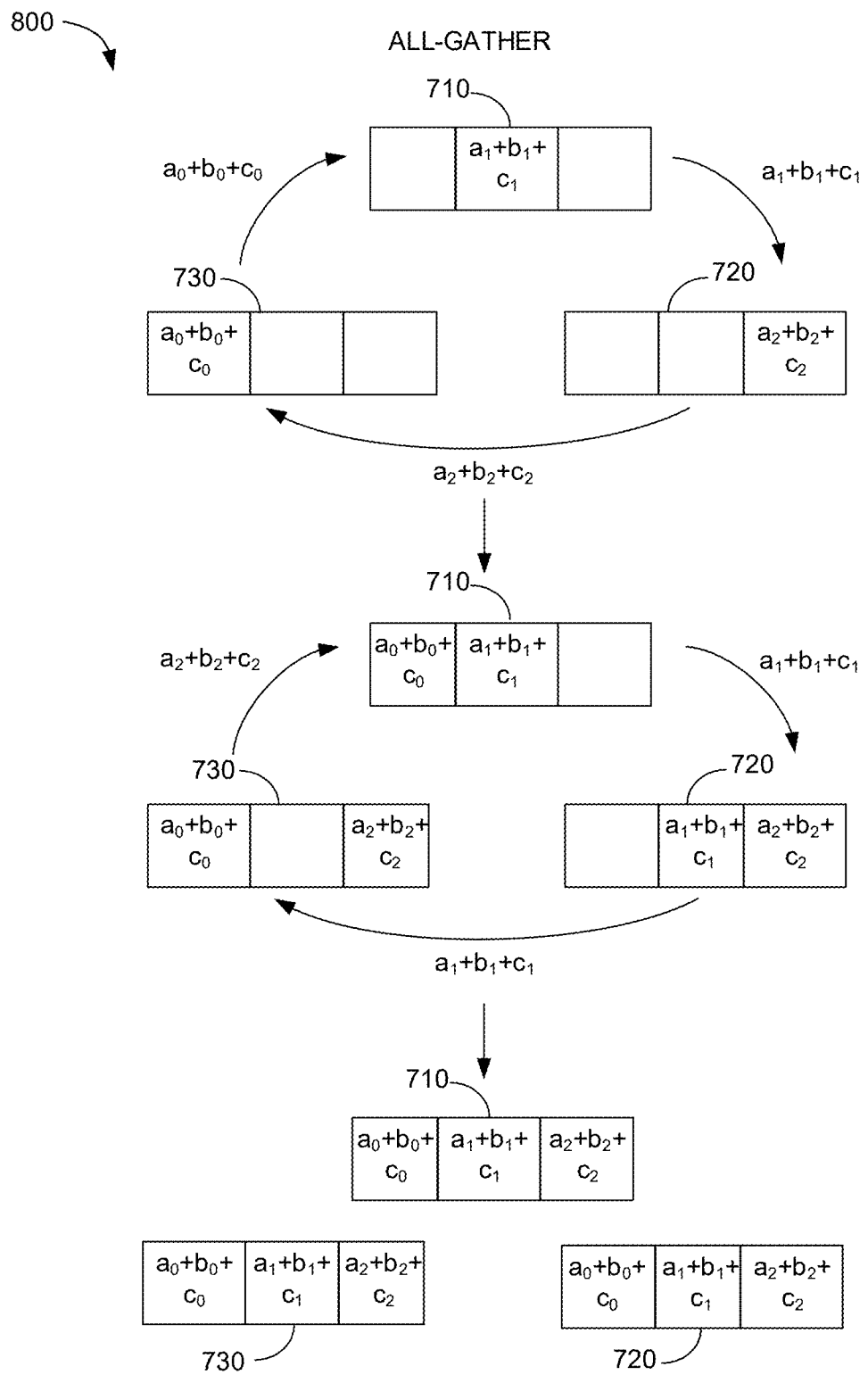
FIG. 8 is a diagram of an illustrative all-gather operation that a coarse-grained reconfigurable processor system performs as part of a ring-based gradient reduction.

FIG. 8 is a diagram of an illustrative all-gather operation 800 that a coarse-grained reconfigurable processor system performs as part of a ring-based gradient reduction.

Illustratively, a seventh external DMA write operation defined by the ninth work queue entry is triggered upon completion of first updated model parameter (a0+b0+c0) by the third reconfigurable processor 730. The seventh external DMA write operation transmits the first updated model parameter (a0+b0+c0) from the third local memory over the external network to the first and second local memories. In some implementations, the seventh external DMA write operation may include two separate work queue entries, one work queue entry to transfer the first updated model parameter (a0+b0+c0) from the third local memory over the external network to the first local memory with triggers another separate work queue entry to transfer the first updated model parameter (a0+b0+c0) from the third local memory over the external network to the second local memory.

An eighth external DMA write operation defined by the third work queue entry is triggered upon completion of the second updated model parameter (a1+b1+c1) by the first reconfigurable processor 710. The eighth external DMA write operation transmits the second updated model parameter (a1+b1+c1) from the first local memory over the external network to the second and third local memories. Similarly to the seventh external DMA write operation, the eighth external DMA write operation may include two separate work queue entries.

A ninth external DMA write operation defined by the sixth work queue entry is triggered upon completion of third updated model parameter (a2+b2+c2) by the second reconfigurable processor 720. The eighth external DMA write operation transmits the third updated model parameter (a2+b2+c2) from the second local memory over the external network to the first and third local memories. Similarly to the seventh external DMA write operation, the ninth external DMA write operation may include two separate work queue entries. After the ninth external DMA write operation, all three CGRPs have all three updated model parameters.

Figure 9:
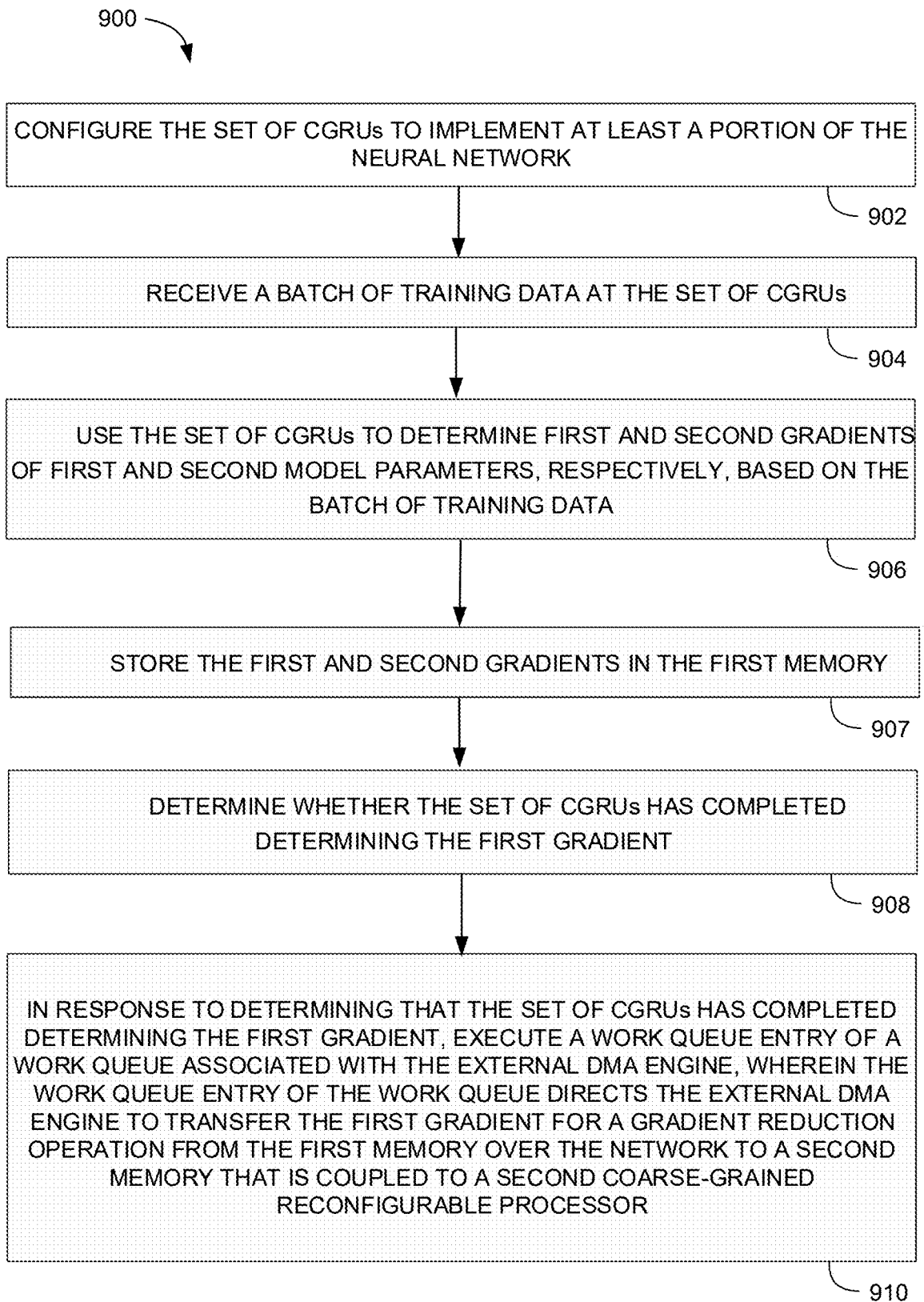
FIG. 9 is a flowchart showing illustrative operations that a coarse-grained reconfigurable processor system performs for implementing data-parallel training of a neural network.

FIG. 9 is a flowchart 900 showing illustrative operations that a coarse-grained reconfigurable processor system (e.g., CGRP system 100 of FIG. 1) performs for implementing data-parallel training of a neural network. The coarse-grained reconfigurable processor system includes a network, a first memory, and a first coarse-grained reconfigurable processor coupled to the first memory that has a set of coarse-grained reconfigurable units (CGRUs) and a network interface, coupled between the first memory and the network, the network interface including an external direct memory access (DMA) engine. For example, CGRP-C 113 in CGRP system 100 of FIG. 1 has a set of CGRUs 153 and a network interface 163 with an external DMA engine 173 coupled between the set of CGRUs 153 and interconnection network 105.

During operation 902, the CGRP system configures the set of CGRUs to implement at least a portion of the neural network. For example, host 101 of CGRP system 100 of FIG. 1 may configure the set of CGRUs 153 in CGRP-C 113 to implement at least a portion of the neural network.

During operation 904, the CGRP system receives a batch of training data at the set of CGRUs. For example, the CGRP system 100 of FIG. 1 may receive a batch of training data at the set of CGRUs 153 of CGRP-C 113.

During operation 906, the CGRP system uses the set of CGRUs to determine first and second gradients of first and second model parameters, respectively, based on the batch of training data. For example, the set of CGRUs 153 in CGRP-C 113 of CGRP system 100 of FIG. 1 may determine first and second gradients of first and second model parameters, respectively, based on the batch of training data.

During operation 907, the CGRP system stores the first and second gradients in the first memory. For example, the CGRP-C113 of CGRP system 100 of FIG. 1 may store the first and second gradients in local memory MEM-C 123.

During operation 908, the CGRP system determines whether the set of CGRUs has completed determining the first gradient. For example, CGRP-C 113 of the CGRP system 100 of FIG. 1 may determine whether the set of CGRUs 153 has completed determining the first gradient.

During operation 910, in response to determining that the set of CGRUs has completed determining the first gradient, the CGRP in the CGRP system executes a work queue entry of a work queue associated with the external DMA engine, wherein the work queue entry of the work queue directs the external DMA engine to transfer the first gradient for a gradient reduction operation from the first memory over the network to a second memory that is coupled to a second coarse-grained reconfigurable processor for a gradient reduction operation. For example, in response to determining that the set of CGRUs 153 has completed determining the first gradient, CGRP-C 113 of CGRP system 100 of FIG. 1 may execute a work queue entry of a work queue associated with the external DMA engine 173, wherein the work queue entry of the work queue directs the external DMA engine 173 to transfer the first gradient for a gradient reduction operation from the local memory MEM-C 123 over the interconnection network 105 to another local memory MEM-F 126 that is coupled to CGRP-F 116.

Illustratively, determining whether the set of CGRUs has completed determining the first gradient may be executed within the first coarse-grained reconfigurable processor while the set of CGRUs determines the second gradient. For example, the set of CGRUs 153 of CGRP-C 113 may determine the second gradient at the same time as the set of CGRUs 153 determines whether the set of CGRUs 153 has completed determining the first gradient.

In some implementations, the network is an Ethernet network and the network interface is an Ethernet network interface, whereby executing the work queue entry may include storing the first gradient from the first memory in at least one input buffer and sending an Ethernet packet including the first gradient from the at least one input buffer to the second memory over the Ethernet network.

Consider the scenario in which, the second coarse-grained reconfigurable processor system includes an additional set of CGRUs and an additional network interface including an additional external DMA engine coupled between the second memory and the network. As an example, in this scenario, the additional set of CGRUs may be configured to implement at least the portion of the neural network, to receive another batch of training data at the additional set of CGRUs, to determine third and fourth gradients of first and second model parameters, respectively, based on the other batch of training data, and to store the third and fourth gradients in the second memory. If desired, the external DMA engine may send a notification to the additional set of CGRUs that the transfer of the first gradient from the first memory to the second memory has completed. In response to receiving the notification, the additional set of CGRUs may implement a first portion of the gradient reduction operation by generating an updated first model parameter based on the first model parameter, the first gradient, and the third gradient As another example, in this scenario, the second CGRP may determine whether the additional set of CGRUs has completed determining the fourth gradient, and in response to determining that the additional set of CGRUs has completed determining the fourth gradient, execute an additional work queue entry of an additional work queue associated with the additional external DMA engine, wherein the additional work queue entry of the additional work queue directs the external DMA engine to transfer the fourth gradient from the second memory over the network to the first memory, and with the set of CGRUs, retrieve the second gradient and the fourth gradient from the first memory for a second portion of the gradient reduction operation.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms.

Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory.

A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic.

The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a coarse-grained reconfigurable processor system for implementing data-parallel training of a neural network, comprising a first memory; a set of coarse-grained reconfigurable units (CGRUs) in a first coarse-grained reconfigurable processor that is coupled to the first memory and configured to implement at least a portion of the neural network, to determine first and second gradients, respectively, of first and second model parameters based on a batch of training data, and to store the first and second gradients in the first memory; a network interface including an external direct memory access (DMA) engine coupled between the first memory and a network; and a work queue associated with the external DMA engine, wherein completion of determining the first gradient triggers a first work queue entry of the work queue that directs the external DMA engine to transfer the first gradient for a gradient reduction operation from the first memory over the network to a second memory that is coupled to a second coarse-grained reconfigurable processor.

In Example 2, the first work queue entry of Example 1 is triggered without action from a source outside of the first memory and the first coarse-grained reconfigurable processor while the set of CGRUs determines the second gradient.

In Example 3, the network interface of Example 1 comprises: at least one input buffer to receive the first gradient from the first memory; a shared replay buffer; and a transmit circuit that is designed to send a plurality of packets, including the first gradient from the at least one input buffer, to the second memory over the network, and, wherein the first gradient is stored in the shared replay buffer from at least a time the first gradient is sent over the network as a first transmission until an acknowledgement message is received through the network indicating that the first gradient has been received.

In Example 4, the network of Example 1 comprises an Ethernet network and the network interface comprises an Ethernet network interface.

In Example 5, the first work queue entry of Example 4 further directs the external DMA engine to: generate at least one external DMA transfer queue entry in an external DMA transfer descriptor memory of the network interface; and generate a first transfer frame including a transfer frame header that is generated based on a protocol of the Ethernet network and a transfer frame payload that comprises an external DMA header and the first gradient.

In Example 6, the external DMA engine of Example 1 notifies the second coarse-grained reconfigurable processor that the transfer of the first gradient from the first memory to the second memory has completed.

In Example 7, the coarse-grained reconfigurable processor system of Example 1 further comprises: an additional set of CGRUs in the second coarse-grained reconfigurable processor configured to implement at least the portion of the neural network, to determine a third gradient of the first model parameter and a fourth gradient of the second model parameter based on another batch of the training data, and to store the third and fourth gradients in the second memory; an additional network interface in the second coarse-grained reconfigurable processor including an additional external direct memory access (DMA) engine coupled between the second memory and the network; and an additional work queue associated with the additional external DMA engine, wherein completion of determining the fourth gradient triggers a first work queue entry of the additional work queue that directs the additional external DMA engine to transfer the fourth gradient for an additional gradient reduction operation from the second memory over the network to the first memory.

In Example 8, the external DMA engine of Example 7 further transfers one or more conditions to the second memory or to the additional external DMA engine.

In Example 9, the external DMA engine of Example 7 further notifies the additional set of CGRUs that transferring the first gradient for the gradient reduction operation from the first memory over the network to the second memory has completed.

In Example 10, the additional set of CGRUs of Example 7 is further configured to retrieve the first and third gradients from the second memory, to implement a first portion of the gradient reduction operation by generating an updated first model parameter based on the first model parameter, the first gradient, and the third gradient, and to store the updated first model parameter in the second memory, and wherein the set of CGRUs is further configured to retrieve the second and fourth gradients from the first memory, to implement a second portion of the gradient reduction operation by generating an updated second model parameter based on the second model parameter, the second gradient, and the fourth gradient, and to store the updated second model parameter in the first memory.

In Example 11, completion of determining the updated first model parameter of Example 10 triggers a second work queue entry of the additional work queue that directs the additional external DMA engine to transfer the updated first model parameter from the second memory over the network to the first memory, and wherein completion of determining the second updated model parameter triggers a second work queue entry of the work queue that directs the external DMA engine to transfer the updated second model parameter from the first memory over the network to the second memory.

Example 12 is a method of operating a coarse-grained reconfigurable processor system for implementing data-parallel training of a neural network, the coarse-grained reconfigurable processor system including a network, a first memory, and a first coarse-grained reconfigurable processor coupled to the first memory that has a set of coarse-grained reconfigurable units (CGRUs) and a network interface, coupled between the first memory and the network, the network interface including an external direct memory access (DMA) engine, comprising: configuring the set of CGRUs to implement at least a portion of the neural network; receiving a batch of training data at the set of CGRUs; using the set of CGRUs to determine first and second gradients of first and second model parameters, respectively, based on the batch of training data; storing the first and second gradients in the first memory; determining whether the set of CGRUs has completed determining the first gradient; and in response to determining that the set of CGRUs has completed determining the first gradient, executing a work queue entry of a work queue associated with the external DMA engine, wherein the work queue entry of the work queue directs the external DMA engine to transfer the first gradient for a gradient reduction operation from the first memory over the network to a second memory that is coupled to a second coarse-grained reconfigurable processor.

In Example 13, determining whether the set of CGRUs has completed determining the first gradient of Example 12 is executed within the first coarse-grained reconfigurable processor while the set of CGRUs determines the second gradient.

In Example 14, the network of Example 12 is an Ethernet network, wherein the network interface is an Ethernet network interface, and wherein executing the work queue entry further comprises: storing the first gradient from the first memory in at least one input buffer; and sending an Ethernet packet including the first gradient from the at least one input buffer to the second memory over the Ethernet network.

In Example 15, the second coarse-grained reconfigurable processor of Example 12 further comprises an additional set of CGRUs and an additional network interface including an additional external DMA engine coupled between the second memory and the network, the method further comprising: configuring the additional set of CGRUs to implement at least the portion of the neural network; receiving another batch of training data at the additional set of CGRUs; using the additional set of CGRUs to determine third and fourth gradients of first and second model parameters, respectively, based on the other batch of training data; storing the third and fourth gradients in the second memory; with the external DMA engine, sending a notification to the additional set of CGRUs that the transfer of the first gradient from the first memory to the second memory has completed; and In response to receiving the notification with the additional set of CGRUs, implement a first portion of the gradient reduction operation by generating an updated first model parameter based on the first model parameter, the first gradient, and the third gradient.

In Example 16, the method of Example 15 further comprises: determining whether the additional set of CGRUs has completed determining the fourth gradient; in response to determining that the additional set of CGRUs has completed determining the fourth gradient, executing an additional work queue entry of an additional work queue associated with the additional external DMA engine, wherein the additional work queue entry of the additional work queue directs the external DMA engine to transfer the fourth gradient from the second memory over the network to the first memory; and with the set of CGRUs, retrieving the second gradient and the fourth gradient from the first memory for a second portion of the gradient reduction operation.

Example 17 is a plurality of reconfigurable processors for training a neural network, comprising: a first reconfigurable processor configured to implement at least a portion of the neural network, to determine first, second, and third gradients of first, second, and third model parameters, respectively, based on a first batch of training data, and to store the first, second, and third gradients in a first local memory that is coupled to the first reconfigurable processor, wherein completion of determining the respective first, second, and third gradient triggers a respective first, second, and third work queue entry; a second reconfigurable processor configured to implement at least the portion of the neural network, to determine fourth, fifth, and sixth gradients of the first, second, and third model parameters, respectively, based on a second batch of training data that is different than the first batch, and to store the fourth, fifth, and sixth gradients in a second local memory that is coupled to the second reconfigurable processor, wherein completion of determining the respective fourth, fifth, and sixth gradient triggers a respective fourth, fifth, and sixth work queue entry; a third reconfigurable processor configured to implement at least the portion of the neural network, to determine seventh, eighth, and ninth gradients of the first, second, and third model parameters, respectively, based on a third batch of training data that is different than the first and second batches, and to store the seventh, eighth, and ninth gradients in a third local memory that is coupled to the third reconfigurable processor, wherein completion of determining the respective seventh, eighth, and ninth gradient triggers a respective seventh, eighth, and ninth work queue entry; an external network that interconnects the first, second, and third reconfigurable processors; and first, second, and third network interfaces including respective first, second, and third external direct memory access (DMA) engines coupled between the respective first, second, and third local memories and the external network, wherein, for executing an external DMA write operation, each one of the first, second, and third network interfaces comprises: a transmit circuit that is designed to send a plurality of packets including a respective gradient of the first to ninth gradients to a predetermined destination over the external network for a gradient reduction operation as directed by a respective work queue entry of the first to ninth work queue entries.

In Example 18, the external network of Example 17 comprises an Ethernet network and wherein the first, second, and third network interfaces comprise a respective Ethernet network interface, and wherein the first work queue entry is triggered without action from a source outside of the first reconfigurable processor and the first memory while the first reconfigurable processor determines the second and third gradients.

In Example 19, the gradient reduction operation of Example 17 is one of a ring-based reduction operation, an all-to-all based reduction operation, a binary tree-based reduction operation, or a hierarchical combination thereof.

In Example 20, the gradient reduction operation is the ring-based reduction operation of Example 19 that uses a ring formed by the first, second, and third reconfigurable processors, wherein the ring-based reduction operation comprises: a reduce-scatter operation, wherein: a first external DMA write operation defined by the first work queue entry transmits the first gradient for generating a first reduced gradient in the gradient reduction operation with the fourth gradient from the first local memory over the external network to the second local memory, a second external DMA write operation defined by the fourth work queue entry transmits the fifth gradient for generating a second reduced gradient in the gradient reduction operation with the eighth gradient from the second local memory over the external network to the third local memory, a third external DMA write operation defined by the seventh work queue entry transmits the ninth gradient for generating a third reduced gradient in the gradient reduction operation with the third gradient from the third local memory over the external network to the first local memory, a fourth external DMA write operation defined by the fifth work queue entry transmits the first reduced gradient for generating a first updated model parameter in the gradient reduction operation with the seventh gradient from the second local memory over the external network to the third local memory, a fifth external DMA write operation defined by the eighth work queue entry transmits the second reduced gradient for generating a second updated model parameter in the gradient reduction operation with the second gradient from the third local memory over the external network to the first local memory, and a sixth external DMA write operation defined by the second work queue entry transmits the third reduced gradient for generating a third updated model parameter in the gradient reduction operation with the sixth gradient from the first local memory over the external network to the second local memory; and an all-gather operation, wherein: a seventh external DMA write operation defined by the ninth work queue entry transmits the first updated model parameter from the third local memory over the external network to the first and second local memories, an eighth external DMA write operation defined by the third work queue entry transmits the second updated model parameter from the first local memory over the external network to the second and third local memories, and a ninth external DMA write operation defined by the sixth work queue entry transmits the third updated model parameter from the second local memory over the external network to the first and third local memories.

What is claimed is:

1. A coarse-grained reconfigurable processor system for implementing data-parallel training of a neural network, comprising:
    a first memory;
    a set of coarse-grained reconfigurable units (CGRUs) in a first coarse-grained reconfigurable processor that is coupled to the first memory and configured to implement at least a portion of the neural network, to determine first and second gradients, respectively, of first and second model parameters based on a batch of training data, and to store the first and second gradients in the first memory;
    a network interface including an external direct memory access (DMA) engine coupled between the first memory and a network; and
    a work queue associated with the external DMA engine, wherein completion of determining the first gradient triggers a first work queue entry of the work queue that directs the external DMA engine to transfer the first gradient for a gradient reduction operation from the first memory over the network to a second memory that is coupled to a second coarse-grained reconfigurable processor.

2. The coarse-grained reconfigurable processor system of claim 1, wherein the first work queue entry is triggered without action from a source outside of the first memory and the first coarse-grained reconfigurable processor while the set of CGRUs determines the second gradient.

3. The coarse-grained reconfigurable processor system of claim 1, wherein the network interface comprises:
    at least one input buffer to receive the first gradient from the first memory;
    a shared replay buffer; and
    a transmit circuit that is designed to send a plurality of packets, including the first gradient from the at least one input buffer, to the second memory over the network, and, wherein the first gradient is stored in the shared replay buffer from at least a time the first gradient is sent over the network as a first transmission until an acknowledgement message is received through the network indicating that the first gradient has been received.

4. The coarse-grained reconfigurable processor system of claim 1, wherein the network comprises an Ethernet network and the network interface comprises an Ethernet network interface.

5. The coarse-grained reconfigurable processor system of claim 4, wherein the first work queue entry further directs the external DMA engine to:
    generate at least one external DMA transfer queue entry in an external DMA transfer descriptor memory of the network interface; and
    generate a first transfer frame including a transfer frame header that is generated based on a protocol of the Ethernet network and a transfer frame payload that comprises an external DMA header and the first gradient.

6. The coarse-grained reconfigurable processor system of claim 1, wherein the external DMA engine notifies the second coarse-grained reconfigurable processor that the transfer of the first gradient from the first memory to the second memory has completed.

7. The coarse-grained reconfigurable processor system of claim 1, further comprising:
    an additional set of CGRUs in the second coarse-grained reconfigurable processor configured to implement at least the portion of the neural network, to determine a third gradient of the first model parameter and a fourth gradient of the second model parameter based on another batch of the training data, and to store the third and fourth gradients in the second memory;
    an additional network interface in the second coarse-grained reconfigurable processor including an additional external direct memory access (DMA) engine coupled between the second memory and the network; and
    an additional work queue associated with the additional external DMA engine, wherein completion of determining the fourth gradient triggers a first work queue entry of the additional work queue that directs the additional external DMA engine to transfer the fourth gradient for an additional gradient reduction operation from the second memory over the network to the first memory.

8. The coarse-grained reconfigurable processor system of claim 7, wherein the external DMA engine further transfers one or more conditions to the second memory or to the additional external DMA engine.

9. The coarse-grained reconfigurable processor system of claim 7, wherein the external DMA engine further notifies the additional set of CGRUs that transferring the first gradient for the gradient reduction operation from the first memory over the network to the second memory has completed.

10. The coarse-grained reconfigurable processor system of claim 7, wherein the additional set of CGRUs is further configured to retrieve the first and third gradients from the second memory, to implement a first portion of the gradient reduction operation by generating an updated first model parameter based on the first model parameter, the first gradient, and the third gradient, and to store the updated first model parameter in the second memory, and wherein the set of CGRUs is further configured to retrieve the second and fourth gradients from the first memory, to implement a second portion of the gradient reduction operation by generating an updated second model parameter based on the second model parameter, the second gradient, and the fourth gradient, and to store the updated second model parameter in the first memory.

11. The coarse-grained reconfigurable processor system of claim 10, wherein completion of determining the updated first model parameter triggers a second work queue entry of the additional work queue that directs the additional external DMA engine to transfer the updated first model parameter from the second memory over the network to the first memory, and wherein completion of determining the second updated model parameter triggers a second work queue entry of the work queue that directs the external DMA engine to transfer the updated second model parameter from the first memory over the network to the second memory.

12. A method of operating a coarse-grained reconfigurable processor system for implementing data-parallel training of a neural network, the coarse-grained reconfigurable processor system including a network, a first memory, and a first coarse-grained reconfigurable processor coupled to the first memory that has a set of coarse-grained reconfigurable units (CGRUs) and a network interface, coupled between the first memory and the network, the network interface including an external direct memory access (DMA) engine, comprising:
configuring the set of CGRUs to implement at least a portion of the neural network;
receiving a batch of training data at the set of CGRUs;
using the set of CGRUs to determine first and second gradients of first and second model parameters, respectively, based on the batch of training data;
storing the first and second gradients in the first memory;
determining whether the set of CGRUs has completed determining the first gradient; and
in response to determining that the set of CGRUs has completed determining the first gradient, executing a work queue entry of a work queue associated with the external DMA engine, wherein the work queue entry of the work queue directs the external DMA engine to transfer the first gradient for a gradient reduction operation from the first memory over the network to a second memory that is coupled to a second coarse-grained reconfigurable processor.

13. The method of claim 12, wherein determining whether the set of CGRUs has completed determining the first gradient is executed within the first coarse-grained reconfigurable processor while the set of CGRUs determines the second gradient.

14. The method of claim 12, wherein the network is an Ethernet network, wherein the network interface is an Ethernet network interface, and wherein executing the work queue entry further comprises:
storing the first gradient from the first memory in at least one input buffer; and
sending an Ethernet packet including the first gradient from the at least one input buffer to the second memory over the Ethernet network.

15. The method of claim 12, wherein the second coarse-grained reconfigurable processor further comprises an additional set of CGRUs and an additional network interface including an additional external DMA engine coupled between the second memory and the network, comprising:
configuring the additional set of CGRUs to implement at least the portion of the neural network;
receiving another batch of training data at the additional set of CGRUs;
using the additional set of CGRUs to determine third and fourth gradients of first and second model parameters, respectively, based on the other batch of training data;
storing the third and fourth gradients in the second memory;
with the external DMA engine, sending a notification to the additional set of CGRUs that the transfer of the first gradient from the first memory to the second memory has completed; and
In response to receiving the notification with the additional set of CGRUs, implement a first portion of the gradient reduction operation by generating an updated first model parameter based on the first model parameter, the first gradient, and the third gradient.

16. The method of claim 15, further comprising:
determining whether the additional set of CGRUs has completed determining the fourth gradient;
in response to determining that the additional set of CGRUs has completed determining the fourth gradient, executing an additional work queue entry of an additional work queue associated with the additional external DMA engine, wherein the additional work queue entry of the additional work queue directs the external DMA engine to transfer the fourth gradient from the second memory over the network to the first memory; and
with the set of CGRUs, retrieving the second gradient and the fourth gradient from the first memory for a second portion of the gradient reduction operation.

17. A plurality of reconfigurable processors for training a neural network, comprising:
a first reconfigurable processor configured to implement at least a portion of the neural network, to determine first, second, and third gradients of first, second, and third model parameters, respectively, based on a first batch of training data, and to store the first, second, and third gradients in a first local memory that is coupled to the first reconfigurable processor, wherein completion of determining the respective first, second, and third gradient triggers a respective first, second, and third work queue entry;
a second reconfigurable processor configured to implement at least the portion of the neural network, to determine fourth, fifth, and sixth gradients of the first, second, and third model parameters, respectively, based on a second batch of training data that is different than the first batch, and to store the fourth, fifth, and sixth gradients in a second local memory that is coupled to the second reconfigurable processor, wherein completion of determining the respective fourth, fifth, and sixth gradient triggers a respective fourth, fifth, and sixth work queue entry;
a third reconfigurable processor configured to implement at least the portion of the neural network, to determine seventh, eighth, and ninth gradients of the first, second, and third model parameters, respectively, based on a third batch of training data that is different than the first and second batches, and to store the seventh, eighth, and ninth gradients in a third local memory that is coupled to the third reconfigurable processor, wherein completion of determining the respective seventh, eighth, and ninth gradient triggers a respective seventh, eighth, and ninth work queue entry;
an external network that interconnects the first, second, and third reconfigurable processors; and
first, second, and third network interfaces including respective first, second, and third external direct memory access (DMA) engines coupled between the respective first, second, and third local memories and the external network, wherein, for executing an external DMA write operation, each one of the first, second, and third network interfaces comprises:
- a transmit circuit that is designed to send a plurality of packets including a respective gradient of the first to ninth gradients to a predetermined destination over the external network for a gradient reduction operation as directed by a respective work queue entry of the first to ninth work queue entries.

18. The plurality of reconfigurable processors of claim 17, wherein the external network comprises an Ethernet network and wherein the first, second, and third network interfaces comprise a respective Ethernet network interface, and wherein the first work queue entry is triggered without action from a source outside of the first reconfigurable processor and the first memory while the first reconfigurable processor determines the second and third gradients.

19. The plurality of reconfigurable processors of claim 17, wherein the gradient reduction operation is one of a ring-based reduction operation, an all-to-all based reduction operation, a binary tree-based reduction operation, or a hierarchical combination thereof.

20. The plurality of reconfigurable processors of claim 19, wherein the gradient reduction operation is the ring-based reduction operation that uses a ring formed by the first, second, and third reconfigurable processors, wherein the ring-based reduction operation comprises:
- a reduce-scatter operation, wherein:
  - a first external DMA write operation defined by the first work queue entry transmits the first gradient for generating a first reduced gradient in the gradient reduction operation with the fourth gradient from the first local memory over the external network to the second local memory,
  - a second external DMA write operation defined by the fourth work queue entry transmits the fifth gradient for generating a second reduced gradient in the gradient reduction operation with the eighth gradient from the second local memory over the external network to the third local memory,
  - a third external DMA write operation defined by the seventh work queue entry transmits the ninth gradient for generating a third reduced gradient in the gradient reduction operation with the third gradient from the third local memory over the external network to the first local memory,
  - a fourth external DMA write operation defined by the fifth work queue entry transmits the first reduced gradient for generating a first updated model parameter in the gradient reduction operation with the seventh gradient from the second local memory over the external network to the third local memory,
  - a fifth external DMA write operation defined by the eighth work queue entry transmits the second reduced gradient for generating a second updated model parameter in the gradient reduction operation with the second gradient from the third local memory over the external network to the first local memory, and
  - a sixth external DMA write operation defined by the second work queue entry transmits the third reduced gradient for generating a third updated model parameter in the gradient reduction operation with the sixth gradient from the first local memory over the external network to the second local memory; and
- an all-gather operation, wherein:
  - a seventh external DMA write operation defined by the ninth work queue entry transmits the first updated model parameter from the third local memory over the external network to the first and second local memories,
  - an eighth external DMA write operation defined by the third work queue entry transmits the second updated model parameter from the first local memory over the external network to the second and third local memories, and
  - a ninth external DMA write operation defined by the sixth work queue entry transmits the third updated model parameter from the second local memory over the external network to the first and third local memories.

* * * * *